(12) United States Patent
Smith

(10) Patent No.: US 9,038,557 B2
(45) Date of Patent: May 26, 2015

(54) HULL ROBOT WITH HULL SEPARATION COUNTERMEASURES

(71) Applicant: Raytheon Company, Waltham, MA (US)

(72) Inventor: Fraser M. Smith, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 97 days.

(21) Appl. No.: 13/769,345

(22) Filed: Feb. 17, 2013

(65) Prior Publication Data

US 2014/0076223 A1 Mar. 20, 2014

Related U.S. Application Data

(60) Provisional application No. 61/701,512, filed on Sep. 14, 2012, provisional application No. 61/701,517, filed on Sep. 14, 2012, provisional application No. 61/701,523, filed on Sep. 14, 2012, provisional application No. 61/701,529, filed on Sep. 14, 2012, provisional application No. 61/701,534, filed on Sep. 14, 2012, provisional application No. 61/701,537, filed on Sep. 14, 2012.

(51) Int. Cl.
| | |
|---|---|
| *B63B 17/00* | (2006.01) |
| *B63B 59/10* | (2006.01) |
| *B63B 59/06* | (2006.01) |
| *B63B 9/00* | (2006.01) |

(Continued)

(52) U.S. Cl.
CPC ............... *B63B 17/00* (2013.01); *Y10S 901/01* (2013.01); *Y10S 901/41* (2013.01); *B63B 59/10* (2013.01); *B63B 59/06* (2013.01); *Y10S 901/44* (2013.01); *B63B 9/00* (2013.01); *B63B 59/08* (2013.01); *B62D 55/265* (2013.01); *B62D 55/32* (2013.01); *B63G 8/001* (2013.01); *G05D 1/00* (2013.01); *G05D 1/021* (2013.01); *G05D 2201/0203* (2013.01)

(58) Field of Classification Search
CPC ........ B63B 59/00; B63B 59/06; B63B 59/08; B63B 59/10
USPC .............................. 114/221 R, 222; 901/1, 44
See application file for complete search history.

(56) References Cited

U.S. PATENT DOCUMENTS

| | | | |
|---|---|---|---|
| 2,104,062 | A | 1/1938 | Temple |
| 2,132,661 | A | 10/1938 | Temple |

(Continued)

FOREIGN PATENT DOCUMENTS

| | | |
|---|---|---|
| CN | 2405719 | 11/2000 |
| CN | 2552648 | 5/2003 |

(Continued)

OTHER PUBLICATIONS

A Copenhagen Climate Treaty; Version 1.0 Draft; A Proposal for a Copenhagen Agreement by Members of the NGO Community; published Jun. 2009; pp. 1-78 (80 pages total).

(Continued)

*Primary Examiner* — Lars A Olson

(57) ABSTRACT

A hull robot is disclosed for operation on a surface of a hull of a vessel. The robot can include a drive subsystem onboard the robot for driving and maneuvering the robot about the hull. A sensor subsystem onboard the robot can sense an attachment state of the robot to the hull. The attachment state can include at least one of attached and detached. A signal generation subsystem onboard the robot can emit a distress signal when the attachment state is detached.

38 Claims, 17 Drawing Sheets

(51) Int. Cl.
*B63B 59/08* (2006.01)
*B62D 55/265* (2006.01)
*B62D 55/32* (2006.01)
*B63G 8/00* (2006.01)
*G05D 1/00* (2006.01)
*G05D 1/02* (2006.01)

(56) References Cited

U.S. PATENT DOCUMENTS

| | | |
|---|---|---|
| 2,386,650 A | 10/1945 | Bell |
| 3,088,429 A | 5/1963 | Johannessen |
| 3,285,676 A | 11/1966 | Hetteen |
| 3,439,937 A | 4/1969 | Dixon |
| 3,554,300 A | 1/1971 | Rosenberg |
| 3,638,600 A | 2/1972 | Modrey |
| 3,682,265 A | 8/1972 | Hiraoka et al. |
| 3,777,834 A | 12/1973 | Hiraoka et al. |
| 3,906,572 A | 9/1975 | Winn |
| 3,922,991 A | 12/1975 | Woods |
| 3,934,664 A | 1/1976 | Pohjola |
| 3,946,692 A | 3/1976 | Sierra et al. |
| 3,960,229 A | 6/1976 | Shio |
| 3,984,944 A | 10/1976 | Maasberg et al. |
| 4,046,429 A | 9/1977 | Pohjola |
| 4,079,694 A | 3/1978 | Galinou |
| 4,119,356 A | 10/1978 | Pohjola |
| 4,135,492 A | 1/1979 | Heitland |
| 4,135,592 A | 1/1979 | Wincent |
| 4,202,453 A | 5/1980 | Wilkes |
| 4,251,791 A | 2/1981 | Yanagisawa et al. |
| 4,401,048 A | 8/1983 | Rogers |
| 4,444,146 A | 4/1984 | DeWitz et al. |
| 4,574,722 A | 3/1986 | Orita et al. |
| 4,674,949 A | 6/1987 | Kroczynski |
| 4,690,092 A | 9/1987 | Rabuse |
| 4,697,536 A | 10/1987 | Hirata |
| 4,697,537 A | 10/1987 | Smith |
| 4,734,954 A | 4/1988 | Greskovics et al. |
| 4,736,826 A | 4/1988 | White et al. |
| 4,788,498 A | 11/1988 | Uemura |
| 4,789,037 A | 12/1988 | Kneebone |
| 4,809,383 A | 3/1989 | Urakami |
| 4,841,894 A | 6/1989 | Nellessen, Jr. |
| 4,890,567 A | 1/1990 | Caduff |
| 4,926,775 A | 5/1990 | Andorsen |
| 5,048,445 A | 9/1991 | Lever et al. |
| 5,174,222 A | 12/1992 | Rogers |
| 5,203,646 A | 4/1993 | Landsberger et al. |
| 5,249,631 A | 10/1993 | Ferren |
| 5,253,605 A | 10/1993 | Collins |
| 5,253,724 A | 10/1993 | Prior |
| 5,285,601 A | 2/1994 | Watkin et al. |
| 5,366,038 A | 11/1994 | Hidetsugu et al. |
| 5,378,994 A | 1/1995 | Novak et al. |
| 5,435,405 A | 7/1995 | Schempf et al. |
| 5,569,371 A | 10/1996 | Perling |
| 5,628,271 A | 5/1997 | McGuire |
| 5,831,432 A * | 11/1998 | Mohri .................... 324/249 |
| 5,849,099 A | 12/1998 | McGuire |
| 5,852,984 A | 12/1998 | Matsuyama et al. |
| 5,894,901 A | 4/1999 | Awamura et al. |
| 5,947,051 A | 9/1999 | Geiger |
| 6,000,484 A | 12/1999 | Zoretich et al. |
| 6,053,267 A | 4/2000 | Fisher |
| 6,064,708 A | 5/2000 | Sakamaki |
| 6,102,145 A | 8/2000 | Fisher |
| 6,125,955 A | 10/2000 | Zoretich et al. |
| 6,209,473 B1 | 4/2001 | Jones et al. |
| 6,276,478 B1 | 8/2001 | Hopkins et al. |
| 6,317,387 B1 | 11/2001 | D'Amaddio et al. |
| 6,564,815 B2 | 5/2003 | McGuire |
| 6,595,152 B2 | 7/2003 | McGuire |
| 6,698,375 B2 | 3/2004 | Delfossie |
| 6,698,376 B2 | 3/2004 | Delahousse et al. |
| 6,792,335 B2 | 9/2004 | Ross et al. |
| 6,886,486 B2 | 5/2005 | Van Rompay |
| 6,886,651 B1 | 5/2005 | Slocum et al. |
| 6,974,356 B2 | 12/2005 | Hobson |
| 7,286,214 B2 | 10/2007 | Reinersman et al. |
| 7,290,496 B2 | 11/2007 | Asfar et al. |
| 7,296,530 B1 | 11/2007 | Bemstein et al. |
| 7,390,560 B2 | 6/2008 | Wallach |
| 7,496,226 B2 | 2/2009 | Negahdaripour et al. |
| 7,520,356 B2 | 4/2009 | Sadegh et al. |
| 7,866,421 B2 | 1/2011 | Moore et al. |
| 7,934,575 B2 | 5/2011 | Waibel et al. |
| 8,214,081 B2 * | 7/2012 | Choi et al. .................... 901/1 |
| 8,342,281 B2 | 1/2013 | Rooney, III |
| 8,386,112 B2 | 2/2013 | Rooney, III |
| 8,393,286 B2 | 3/2013 | Rooney, III et al. |
| 8,393,421 B2 | 3/2013 | Kornstein et al. |
| 8,506,719 B2 * | 8/2013 | Holappa et al. ............... 114/222 |
| 8,723,536 B2 | 5/2014 | Miyazaki et al. |
| 2003/0000445 A1 | 1/2003 | McGuire |
| 2004/0089216 A1 | 5/2004 | Van Rompay |
| 2004/0133999 A1 | 7/2004 | Walton |
| 2004/0250934 A1 | 12/2004 | Hamdan |
| 2005/0027412 A1 | 2/2005 | Hobson et al. |
| 2005/0156562 A1 | 7/2005 | Cohen et al. |
| 2005/0199171 A1 | 9/2005 | Ecklund |
| 2005/0216125 A1 | 9/2005 | Huston et al. |
| 2006/0175439 A1 | 8/2006 | Steur et al. |
| 2006/0191457 A1 | 8/2006 | Murphy |
| 2006/0249622 A1 | 11/2006 | Steele |
| 2006/0261772 A1 | 11/2006 | Kim |
| 2007/0089916 A1 | 4/2007 | Lundstrom |
| 2007/0276552 A1 | 11/2007 | Rodocker et al. |
| 2007/0284940 A1 | 12/2007 | Koolhiran |
| 2008/0009984 A1 | 1/2008 | Lee et al. |
| 2008/0202405 A1 | 8/2008 | Kern |
| 2008/0276407 A1 | 11/2008 | Schnittman |
| 2008/0281470 A1 | 11/2008 | Gilbert et al. |
| 2008/0300821 A1 | 12/2008 | Frank et al. |
| 2008/0308324 A1 | 12/2008 | Moser et al. |
| 2009/0078484 A1 | 3/2009 | Kocijan |
| 2009/0094765 A1 | 4/2009 | Osaka et al. |
| 2009/0166102 A1 | 7/2009 | Waibel et al. |
| 2009/0301203 A1 | 12/2009 | Brussieux |
| 2010/0000723 A1 | 1/2010 | Chambers |
| 2010/0126403 A1 | 5/2010 | Rooney, III et al. |
| 2010/0131098 A1 | 5/2010 | Rooney, III et al. |
| 2010/0217436 A1 | 8/2010 | Jones et al. |
| 2010/0219003 A1 | 9/2010 | Rooney, III et al. |
| 2010/0238050 A1 | 9/2010 | Rhodes et al. |
| 2011/0050374 A1 | 3/2011 | Dvorak |
| 2011/0067615 A1 | 3/2011 | Rooney, III et al. |
| 2011/0083599 A1 | 4/2011 | Kornstein et al. |
| 2011/0208417 A1 | 8/2011 | Fink et al. |
| 2011/0282536 A1 | 11/2011 | Rooney, III |
| 2012/0006352 A1 | 1/2012 | Holappa et al. |
| 2012/0215348 A1 | 8/2012 | Skrinde |
| 2014/0076223 A1 | 3/2014 | Smith |
| 2014/0076224 A1 | 3/2014 | Smith |
| 2014/0076225 A1 | 3/2014 | Smith |
| 2014/0076226 A1 | 3/2014 | Smith |
| 2014/0077587 A1 | 3/2014 | Smith |
| 2014/0081504 A1 | 3/2014 | Smith |
| 2014/0090906 A1 | 4/2014 | Kornstein et al. |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| FR | 1352056 A | 2/1964 |
| FR | 2861457 A1 | 4/2005 |
| FR | 2948920 A1 | 2/2011 |
| GB | 2038721 | 7/1980 |
| GB | 2103162 | 2/1983 |
| GB | 2165330 A | 4/1986 |
| JP | S48-014096 | 2/1973 |
| JP | S49-001434 | 1/1974 |
| JP | S50-012797 | 2/1975 |

(56) References Cited

FOREIGN PATENT DOCUMENTS

| | | |
|---|---|---|
| JP | S50-81487 U | 7/1975 |
| JP | 58-012075 | 1/1983 |
| JP | S58-14096 | 1/1983 |
| JP | S60-131174 | 7/1985 |
| JP | S62-130999 | 8/1987 |
| JP | 04-002592 | 1/1992 |
| JP | H05-19086 | 1/1993 |
| JP | 06-099888 | 4/1994 |
| JP | 08-310384 | 11/1996 |
| JP | H10-16884 | 1/1998 |
| JP | 2003025265 | 1/2003 |
| JP | 2005-335882 | 12/2005 |
| WO | WO 99/07489 A1 | 2/1999 |
| WO | WO 02/074611 A2 | 9/2002 |
| WO | WO 02/074611 A3 | 9/2002 |
| WO | WO 2005/014387 | 2/2005 |
| WO | WO 2010/059195 | 5/2010 |
| WO | WO 2010/134022 A1 | 11/2010 |
| WO | WO 2011/022037 | 2/2011 |
| WO | WO 2011015786 A1 | 2/2011 |
| WO | WO 2011/034558 | 3/2011 |
| WO | WO 2011/046592 | 4/2011 |
| WO | WO 2011/142800 | 11/2011 |
| WO | WO 2011/146103 | 11/2011 |
| WO | WO 2012/104109 A1 | 8/2012 |

OTHER PUBLICATIONS

Anti-Fouling Systems; Focus on IMO, International Maritime Organization; UK; 2002; pp. 1-31; http://www.uscg.mil/hq/cg5/cg522/cg5224/docs/FOULING2003.pdf.

Borchardt; Grooming the Fleet, Biofouling Slows Vessels and Wastes Fuels, so the Navy is Looking at an Underwater Robot to Keep its Hulls Shipshape; Mechanical Engineering; Apr. 2010; pp. 33-35; vol. 132, No. 4.

Fernandez; NAFTA and Member Country Strategies for Maritime Trade and Marine Invasive Species; Journal of Environmental Management; 2008; pp. 308-321; vol. 89.

Garelick, et a; RTI International EnSys Energy & Systems, Inc.; Navigistics Consulting; Global Trade and Fuels Assessment—Future Trends and Effects of Designating Requiring Clean Fuels in the Marine Sector: Task Order No. 1; Draft Report; RTI Project No. 0209701.001; Apr. 2006; 82 pages.

Hismar; Hismar News Report No. 2; 2008; http://hismar.ncl.ac.uk/public_docs/News_Reports/News%20Report%20No2_UNEW.pdf; 4 pages.

Hismar; Hull Identification System for Maritime Autonomous Robots; http://hismar.ncl.ac.uk/public_docs/HISMAR_Poster.pdf; 1 page.

Kohli; Biofouling and Design of a Biomimetic Hull-Grooming Tool; Naval Surface Warfare Center Carderock Division; West Bethesda; MD; NSWCCD-CISD-2007/002; Ship Systems Integration & Design Department Technical Report; Sep. 2007; 38 pages.

Man; B&W, Basic Principles of Ship Propulsion; Basics of Ship Propulsion; Apr. 2004; pp. 1-30.

Munk; Fuel Conservation Through Managing Hull Resistance; Motorship Propulsion Conference; Copenhangen; Apr. 26, 2006; pp. 1-10.

Paik et al.; Condition Assessment of Aged Ships; Proceedings of the 16th International Ship and Offshore Structures Congress; Dec. 31, 2006; pp. 273-283; vol. 2; The 16th International Ship and Offshore Structures Congress, Southampton, UK.

Preiser et al.; Energy (Fuel) Conservation Through Underwater Removal and Control of Fouling on Hulls of Navy Ships, Naval Research and Development Center, Materials Department, Annapolis.

U.S. Appl. No. 12/313,643, filed Nov. 21, 2008; James H. Rooney III; office action dated Aug. 25, 2014.

U.S. Appl. No. 12/583,346, filed Aug. 19, 2009; James H. Rooney III; office action dated Aug. 26, 2014.

U.S. Appl. No. 13/769,337, filed Feb. 17, 2013; Fraser M. Smith; office action dated Sep. 3, 2014.

U.S. Appl. No. 13/769,339, filed Feb. 17, 2013; Fraser M. Smith; office action dated Sep. 3, 2014.

U.S. Appl. No. 13/769,342, filed Feb. 17, 2013; Fraser M. Smith; office action dated Sep. 10, 2014.

Research and Development Report, Dec. 1975; 52 pages.

Reed et al; Automatic Ship Hull Inspection Using Unmanned Underwater Vehicles; Proceedings from the 7th International Symposium on Technology and the Mine Problem; Monterey, USA; May 2006; 10 pages.

Rosenhahn et al; Advanced Nanostructures for the Control of Biofouling: the FP 6 EU Integrated Project AMBIO; Biointerphases; Mar. 2008; Published Feb. 21, 2008; pp. IR1-IR5; vol. 3; No. 1.

Serene et al; Design of a Remotely Operated Vehicle (ROV) for Underwater Ship Hull Cleaning; National University of Singapore; pp. 1-6; 2003.

Tallett et al; Potential Marine Fuels Regulations: Impacts on Global Refining; Costs & Emissions; Joint IFQC & IPIECA Roundtable; Impacts of CO2 Emissions form Refining & Shipping; London, England; Oct. 1, 2007; 17 pages.

Townsin; The Ship Hull Fouling Penalty; Biofouling; Jan. 2003; pp. 9-15; vol. 19 (supplement).

Vaganay et al; Ship Hull Inspection with the HAUV: US Navy and NATO Demonstrations Results; OCEANS 2006; Sep. 2006; pp. 1-6.

Yuan et al.; The Design of Underwater Hull-Cleaning Robot; Journal of Marine Science and Application; Jun. 2001; pp. 41-45; vol. 3; No. 1.

Written Opinion of the International Searching Authority, International Application No. PCT/US2011/000787, Jul. 20, 2011, 7 pgs. (unnumbered).

Written Opinion of the International Searchign Authority, International Application No. PCT/US2011/000770, Aug. 9, 2011, 5 pgs. (unnumbered).

Written Opinion of the International Searching Authority, International Application No. PCT/US2010/002163, Oct. 13, 2010, 5 pgs. (unnumbered).

Written Opinion of the International Searching Authority, International Application No. PCT/US2010/002164. Oct. 8, 2010, 5 pgs. (unnumbered).

Written Opnion of the International Searching Authority for PCT Application No. PCT/US2009/006122 mailed Feb. 3, 2010 9 (seven pages).

Written Opinion of the International Searching Authority, International Application No. PCT/US2010/002693, Dec. 9, 2010, 8 pages (unnumbered).

PCT Application PCT/US2010/02693; filing date Oct. 6, 2010; Raytheon Company; International Search Report mailed Dec. 9, 2010.

PCT Application PCT/US2011/000787 filing date May 5, 2011; James H. Rooney; International Search Report mailed Jul. 20, 2011.

PCT Application PCT/US2011/000770; filing date May 3, 2011; James H. Rooney III; INternationa Search Report mailed Aug. 9, 2011.

PCT Application PCT/US2010/002163; filing date Aug. 4, 2010; James H. Rooney; International Search Report mailed Oct. 13, 2010.

PCT Application PCT/US2010/002164; filing date Aug. 4, 2010; James H. Rooney; International Search Report mailed Oct. 8, 2010.

PCT Application PCT/US2009/006122; filing date Nov. 16, 2009; James H. Rooney III; International Search Report mailed Feb. 3, 2010.

PCT Application PCT/US2013/059552; filing date Sep. 12, 2013; Raytheon Company; International Search Report mailed Dec. 20, 2013.

PCT Application PCT/US2013/059552; filing date Sep. 12, 2013; Raytheon Company; International Search Report mailed Feb. 21, 2014.

PCT Application PCT/US2013/059527; filing date Sep. 12, 2013; Raytheon Company; International Search Report mailed Mar. 3, 2014.

PCT Application PCT/US2013/059548; filing date Sep. 12, 2013; Raytheon Company; International Search Report mailed Apr. 16, 2014.

(56) References Cited

OTHER PUBLICATIONS

PCT Application PCT/US2013/059551; filing date Sep. 12, 2013; Raytheon Company; International Search Report mailed Mar. 10, 2014.
PCT Application PCT/US2013/059546; filing date Sep. 12, 2013; Raytheon Company; International Search report mailed Jan. 20, 2014.
PCT Application PCT/US2013/059527; filing date Sep. 12, 2013; Raytheon Company; International Search Report mailed May 13, 2014.
PCT Application PCT/US2013/059550; filing date Sep. 12, 2013; Raytheon Company; International Search Report mailed Jun. 3, 2014.
PCT Application PCT/US2013/059548; filing date Sep. 12, 2013; Raytheon Company; International Search Report mailed Jun. 30, 2014.
EP Application EP09827853; filed Aug. 11, 2011; Raytheon Company; Supplemental European Search Report Apr. 23, 2014.
U.S. Appl. No. 12/313,643, filed Nov. 21, 2008; James H. Rooney III; office action dated Sep. 17, 2012.
U.S. Appl. No. 12/583,346, filed Aug. 19, 2009; James H. Rooney III; office action dated Sep. 25, 2012.
U.S. Appl. No. 12/313,643, filed Nov. 21, 2008; James H. Rooney III; office action issued Apr. 13, 2012.
U.S. Appl. No. 12/586,248, filed Sep. 18, 2009; James H. Rooney III office action issued May 24, 2012.
U.S. Appl. No. 12/587,949, filed Oct. 14, 2009; Howard R. Kornstein; office action issued May 25, 2012.
U.S. Appl. No. 12/800,174, filed May 10, 2010; James H. Rooney III; office action issued Feb. 24, 2012.
U.S. Appl. No. 12/583,346, filed Aug. 19, 2009; James H. Rooney, III; office action dated Feb. 27, 2013.
U.S. Appl. No. 12/583,346, filed Aug. 19, 2009; James H. Rooney III; office action dated Feb. 27, 2014.
U.S. Appl. No. 12/586,248, filed Sep. 18, 2009; James H. Rooney III; office action mailed Dec. 13, 2011.
U.S. Appl. No. 12/586,248, filed Sep. 18, 2009; James H. Rooney III; Notice of Allowance issued Oct. 24, 2012.
U.S. Appl. No. 12/587,949, filed Oct. 14, 2009; Howard R. Kornstein; notice of allowance mailed Sep. 21, 2012.
U.S. Appl. No. 12/800,486, filed May 17, 2010; James H. Rooney III; notice of allowance dated Sep. 27, 2012.
U.S. Appl. No. 12/800,174, filed May 10, 2010; James H. Rooney III; notice of allowance dated Aug. 17, 2012.
U.S. Appl. No. 13/313,643, filed Nov. 21, 2008; James H. Rooney III; office action dated Feb. 26, 2014.
U.S. Appl. No. 13/794,594, filed Mar. 11, 2013; Howard R. Kornstein; office action dated May 1, 2014.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; 30$^{th}$ International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/794,594, filed Mar. 11, 2013; Howard R. Kornstein; office action dated Oct. 15, 2014.
U.S. Appl. No. 13/769,344; filed Feb. 17, 2013; Fraser M. Smith; office action dated Oct. 28, 2014.
U.S. Appl. No. 13/769,339; filed Feb. 17, 2013; Fraser M. Smith; Notice of Allowance mailed Jan. 30, 2015.
U.S. Appl. No. 13/769,337; filed Feb. 17, 2013; Fraser M. Smith; Notice of Allowance mailed Feb. 10, 2015.
U.S. Appl. No. 13/794,594; filed Mar. 11, 2013; Howard R. Kornstein; office action dated Mar. 04, 2015.
U.S. Appl. No. 13/769,344; filed Feb. 17, 2013; Fraser M. Smith; office action dated Mar. 10, 2015.
U.S. Appl. No. 13/769,342; filed Feb. 17, 2013; Fraser M. Smith; office action dated Mar. 10, 2015.
U.S. Appl. No. 12/313,643; filed Nov. 21, 2008; James H. Rooney, III; office action dated Apr. 08, 2015.
U.S. Appl. No. 12/583,346; filed Aug. 19, 2009; James H. Rooney, III; office action dated Apr. 08, 2015.

* cited by examiner

HULL ROBOT WITH HULL SEPARATION COUNTERMEASURES

RELATED APPLICATIONS

This application claims the benefit of the following provisional patent applications, the contents of each of which are incorporated herein by reference in their entirety: U.S. provisional patent application Ser. No. 61/701,512, filed on Sep. 14, 2012; U.S. provisional patent application Ser. No. 61/701,517, filed on Sep. 14, 2012; U.S. provisional patent application Ser. No. 61/701,523, filed on Sep. 14, 2012; U.S. provisional patent application Ser. No. 61/701,529, filed on Sep. 14, 2012; U.S. provisional patent application Ser. No. 61/701,534, filed on Sep. 14, 2012; and U.S. provisional patent application Ser. No. 61/701,537, filed on Sep. 14, 2012.

This application is related to copending nonprovisional U.S. patent application Ser. Nos. 13/769,337, filed on Feb. 17, 2013, and entitled, "Hull Robot for Autonomously Detecting Cleanliness of a Hull"; Ser. No. 13/769,339, filed on Feb. 17, 2013, and entitled, "Autonomous Hull Inspection"; Ser. No. 13/769,342, filed on Feb. 17, 2013, and entitled "Autonomous Hull Navigation"; Ser. No. 13/769,344, filed on Feb. 17, 2013, and entitled, "Hull Cleaning Robot"; and Ser. No. 13/769,346, filed on Feb. 17, 2013, and entitled, "Magnetic Track", the contents of each of which is hereby incorporated by reference herein in their entirety.

This application is also related to the following copending U.S. patent application Ser. No. 12/313,643, filed on Nov. 21, 2008; Ser. No. 12/583,346, filed on Aug. 19, 2009; Ser. No. 12/586,248, filed on Sep. 18, 2009; Ser. No. 12/587,949, filed on Oct. 14, 2009; and Ser. No. 12/800,486 filed on May 17, 2010; the contents of each of which is hereby incorporated herein by reference in their entirety.

BACKGROUND

The structural integrity of a vessel hull is an important safety an economical concern. For example, frictional resistance due to buildup on or fouling of the hull by algae, sea grass, barnacles, and the like as a vessel moves through the water can increase the fuel consumption of the vessel. The result is added cost to operate the vessel and increased emissions. Moreover, monitoring of damage to the hull is useful in determining when and where repairs should be made.

A variety of methods are currently employed to lower the chance of bio-fouling and to monitor the structural integrity of the hull. For example, typically, while the ship is dockside and/or during normal unlading conditions, the hull can be periodically inspected manually, such as by scuba divers using various equipment. The cost of such an inspection procedure can be costly. This type of inspection effort may be repeated at a predetermined period of months, such as every ten to twenty months or sooner, particularly if there is suspicion of damage to the vessel hull. To properly inspect the vessel hull, the hull often must first be cleaned. As a complication, however, some jurisdictions have made dockside cleaning illegal due to the release of contaminants into the water, and particularly particles of anti-fouling paint which is toxic, and which has been found to contaminate the water.

Most prior hull cleaning robots suffer from various shortcomings. Typically, robots are connected to a cable and powered and controlled by an on-board power supply and control system and are able to operate only on a stationary vessel. Further, inspection techniques for determining the cleanliness of the hull are inefficient. The monetary cost and intrinsic value of such robots can be high, and therefore, there is a desire to properly secure the robot to avoid damage or loss.

SUMMARY

A hull robot is disclosed for operation on a surface of a hull of a vessel in accordance with an example of the present technology. The robot can include a drive subsystem onboard the robot for driving and maneuvering the robot about the hull. A sensor subsystem onboard the robot can sense an attachment state of the robot to the hull. The attachment state can include at least one of attached and detached. A signal generation subsystem onboard the robot can emit a distress signal when the attachment state of the robot is that of detached, or in other words, when the robot becomes detached from the hull.

A method of detecting detachment of a hull robot from a surface of a hull of a vessel, in accordance with an example of the present technology, includes positioning the robot about the hull and sensing an attachment state of the robot to the hull using a sensor subsystem onboard the robot. The attachment state can include at least one of attached and detached. A distress signal can be emitted using a signal generation subsystem onboard the robot when the attachment state of the robot is that of detached.

A system for detecting detachment of a hull robot from a surface of a hull of a vessel is described in accordance with an example of the present technology. The system can include a processor, a memory for storing hull property data, and a sensor carried by the hull robot, the sensor being configured to detect an attachment state of the robot relative to the hull. A distress module carried by the hull robot can identify a distress situation when an attachment state of the robot is that of detached.

DETAILED DESCRIPTION

Figure 1:
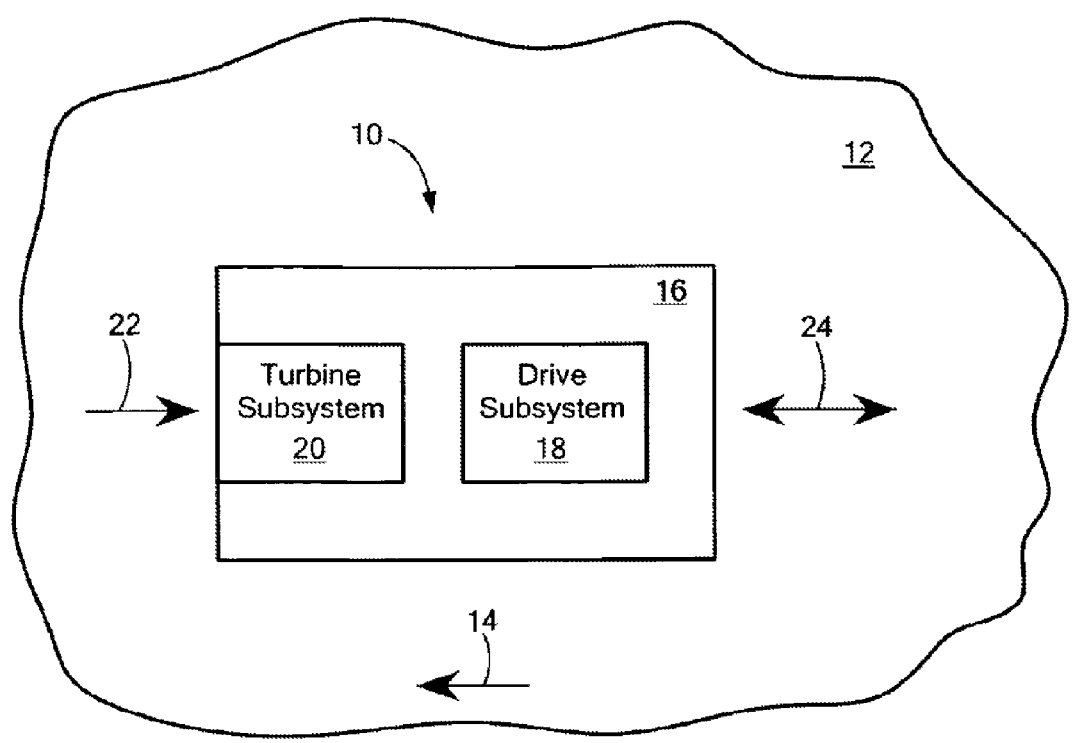
FIG. 1 is a schematic block diagram showing an example of a robot in accordance with an example of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

As used herein, "robot body" is intended as a broad term to define one or more structural components (e.g., a frame, chassis, cover, etc.) capable of supporting one or more other components of a hull robot or its subsystems, and/or capable of providing covering and/or concealment of one or more components or subsystems of the hull robot.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Example Embodiments

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted in the present disclosure that when describing the system, or the related devices or methods, individual or separate descriptions are considered applicable to one another, whether or not explicitly discussed in the context of a particular example or embodiment. For example, in discussing an energy harvester configuration per se, the device, system, and/or method embodiments are also included in such discussions, and vice versa.

Furthermore, various modifications and combinations can be derived from the present disclosure and illustrations, and as such, the following figures should not be considered limiting.

FIG. 1 shows robot 10 on vessel hull 12 (e.g., a ship) underway in the direction of vector 14. Robot body 16 houses drive subsystem 18 and turbine subsystem 20. Fluid (e.g., water) moves past hull 12 in the direction of vector 22 due to the motion of the vessel. In accordance with the subject invention, turbine subsystem 20 is actuatable (e.g., driven) by the moving fluid and used to operate at least drive subsystem 18.

The result is a robot able to maneuver, at a minimum, about hull 12 as shown by arrows 24. Furthermore, the robot is typically able to maneuver in one or more controlled paths about the hull, which are not necessarily aligned with vector 14 and which are in addition to the directions shown by arrows 24. The robot can be powered by the action of the water flowing past the hull while the vessel is underway. In this way, cleaning and/or inspection and the like can be undertaken even continuously while the vessel is in operation. The robot is thus configured to harvest the energy it needs from the action of a fluid flowing past the robot.

Typically, other subsystems can be included as components of robot 10, for example, a cleaning subsystem, a navigation subsystem, a communications subsystem, and the like. Moreover, although certainly possible in some embodiments, in many embodiments the robot body 16 need not be tethered to any kind of an on-board power or control subsystem. The turbine subsystem can operate drive subsystem 18 (and, in one example, a cleaning subsystem) directly or via a generator charging a power supply or power subsystem (e.g., a battery pack) which supplies power to one or more motors driving the drive subsystem and/or the cleaning subsystem. The battery pack can also be used to energize the other electronic and/or electromechanical subsystems associated with the robot. In one aspect, the generator may drive one or more motors directly.

Figure 2:
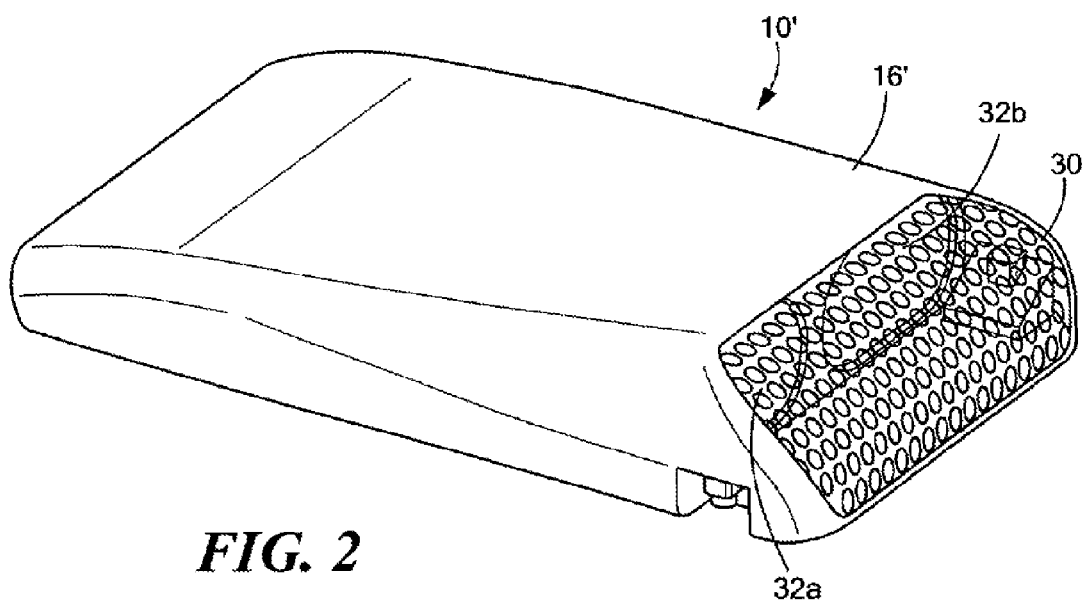
FIG. 2 is a perspective view of an example hull robot in accordance with an example of the present technology.

In one particular example, robot 10', FIG. 2 includes body 16' with flow inlet filter screen 30. Body 16' may comprise any number of hydrodynamic or other shapes or configurations. As such, the shape or configuration illustrated is not meant to be limiting in any way. The shape can be designed to urge the robot against the hull or to increase a force of attachment of the robot to the hull, when the robot is deployed on the hull, as water moves over the robot due to the action of the vessel moving through the water. In other words, depending upon the particular hydrodynamics of the robot, water passing over the robot can induce a downward force on the robot that urges the robot against the hull, or that functions to more aggressively attach the robot to the hull, such as by increasing an already existing force of attachment, thus helping to secure the robot to the hull.

Figure 3:
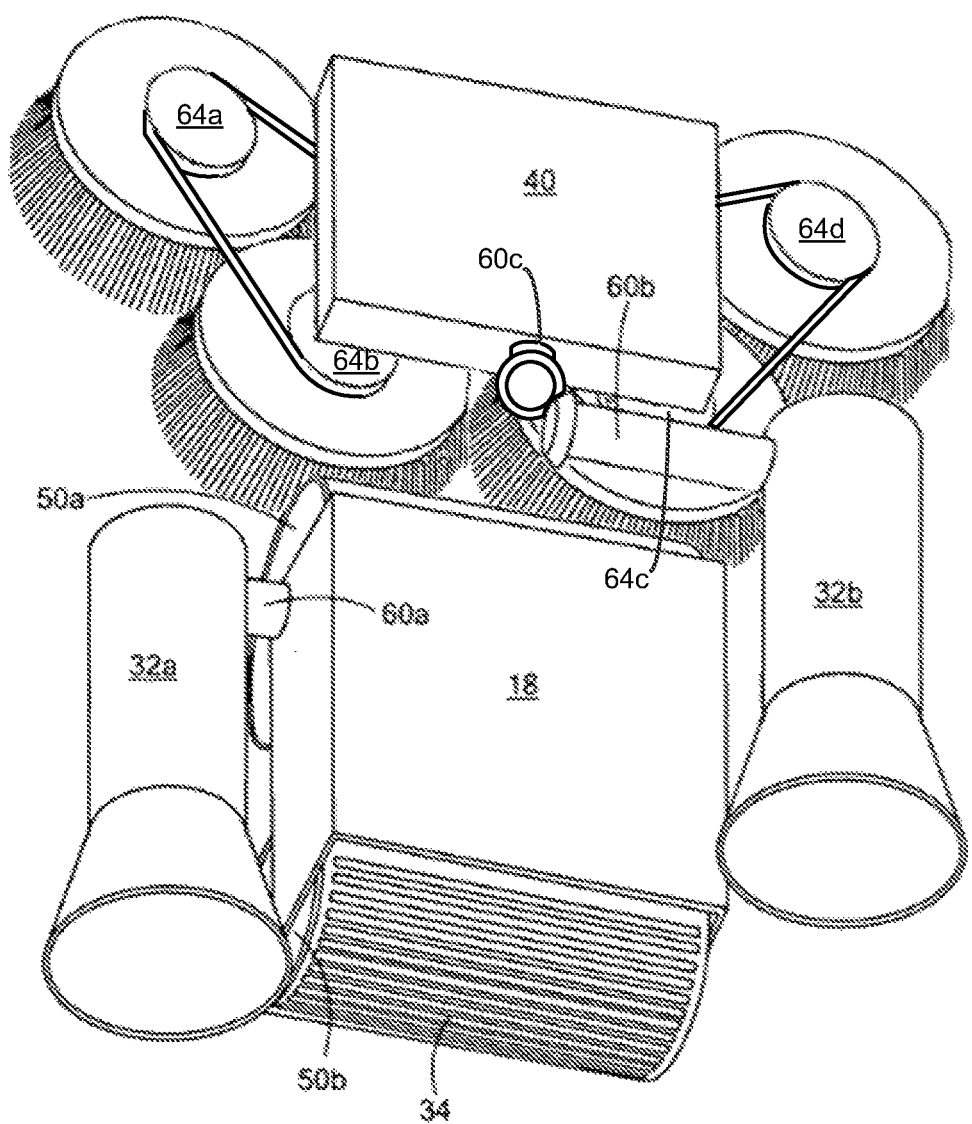
FIG. 3 is top perspective view of components within a hull robot in accordance with an example of the present technology.

Referring to FIG. 3, the intakes of turbines 32a and 32b can be seen behind screen 30. The intakes of turbines 32a and 32b are exposed, via screen 30, to fluid moving past the hull. In this example, robot housing 16' is approximately thirty-six inches long, twenty-four inches wide, and six inches tall.

Figure 4:
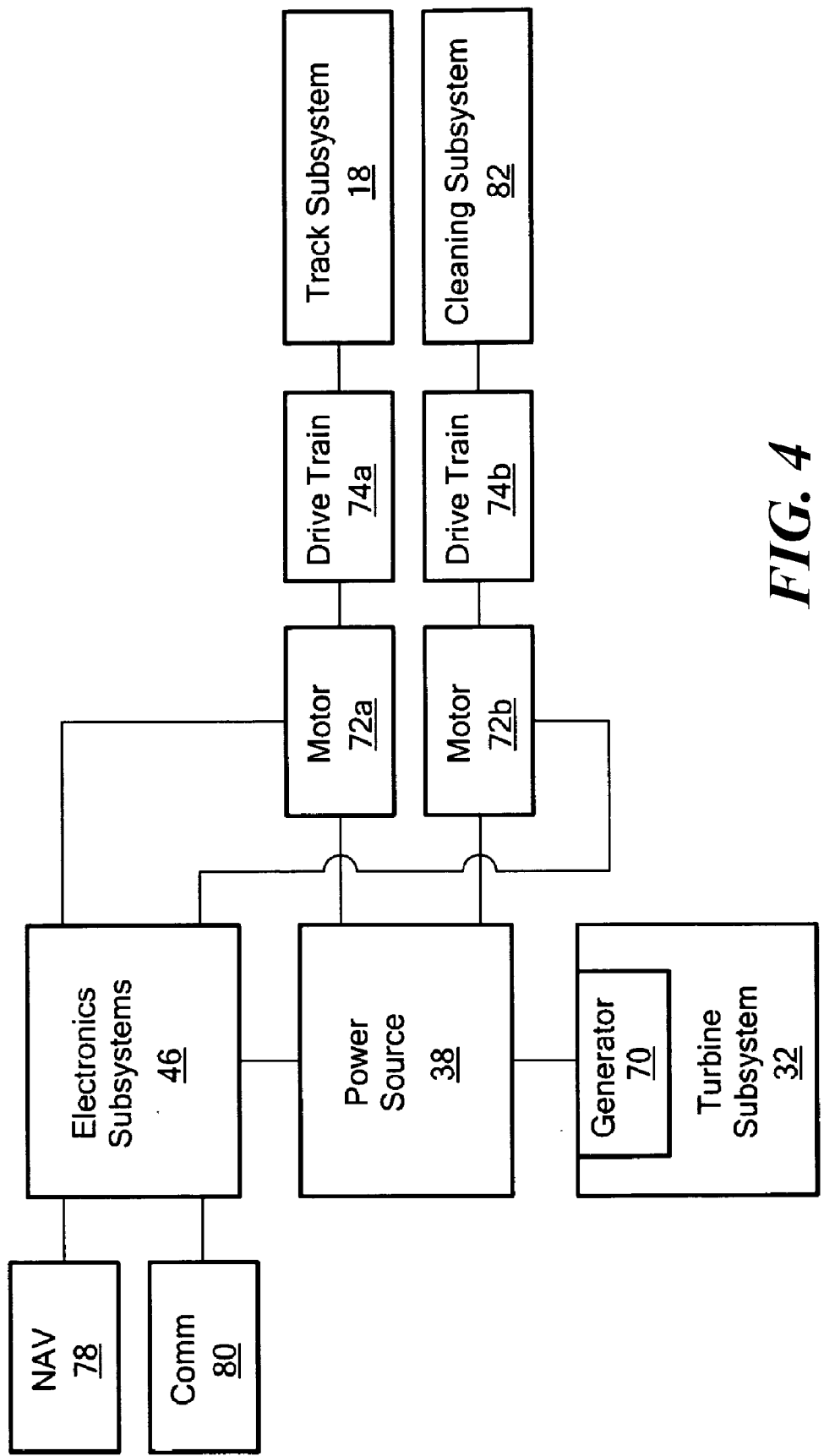
FIG. 4 is a block diagram showing the subsystems associated with one version of a hull cleaning robot in accordance with the subject technology.

As shown in FIGS. 3-4, the drive subsystem in this example includes at least one drive track 34 configured to hold the robot on the hull as robot 10' maneuvers. Multiple drive tracks could be provided. Cleaning brushes 36a-36d can be included for cleaning the hull of the vessel. A battery pack and/or electronic control module can also be included. The brush(es) may be driven by gear drives, which may in turn be driven by the shaft of one of the turbines 32a or 32b, or by a motor in an embodiment where the shaft of turbine 32b drives a generator providing power to battery pack for the operation of the motor. For example, the cleaning brushes 36-36d may be supported by the robot body and may be rotated using a belt and pulley system actuated by a motor 40 (which may be powered by power source 38), where some brushes 36a-36b counter-rotate relative to other brushes 36c-36d. Any number of brushes or cleaning elements in any configuration or organization may be used to suit a particular application, such as a greater or lesser number of brushes. For example, FIG. 3 illustrates brushes 36b-36c closer to endless belt 34 or a center of the robot than the configuration of FIG. 5 or FIGS. 9a-9b where brushes 36b-36c are relatively farther from the center and closer to an edge of the robot as compared with FIG. 3. Other cleaning subsystems are also contemplated. For example, the robot could include a squeegee, a passive cleaning pad, water jets, and the like. Where a passive cleaning apparatus is used, power in the form of electricity or torque generated by the turbine subsystem would not generally be used to operate the cleaning apparatus.

Referring again to FIGS. 3 and 4, turbine 32a can be used to drive track roller 50a directly in the case where the shaft of turbine 32a is coupled to roller 50a via a drive train. But, preferably, the shaft of turbine 32a is coupled to a generator powering motor which drives roller 50a.

In one example, an endless belt 34 is disposed over rollers 50a and 50b and includes magnets and/or magnetic materials 52 embedded (e.g., encapsulated) in the material of the belt, which can be made of rubber. Such a magnetic belt may effectively secure the robot to the hull of the vessel. Other magnetic subsystems used to engage a robot with the hull of a vessel are also contemplated.

In the example shown in FIG. 3, the shaft of turbine 32a is coupled to drive train 60a which drives track roller 50a and the shaft of turbine 32b is coupled to drive train 60b which drives brushes 36a-36d via belts and pulleys 64a-64d or gearing 60a-60c. Other means for operating the at least one drive track and the cleaning apparatus are possible.

FIG. 4, for example, illustrates a turbine subsystem 32 (including one or more devices actuatable by fluid flowing past the hull), which includes generator 70 that operates to recharge power source 38. One or more motors, such as motors 72a and 72b are powered by power source 38. Motor 72a drives track subsystem 18 via drive train 74a. The direction of travel of the robot can be reversed via electronic control subsystem 76 which is configured to reverse the direction of motor 72a based on inputs, for example, from navigation subsystem 78 and/or communication subsystem 80.

Electronic controller 76 is also powered by power source 38. Similarly, motor 72b drives cleaning subsystem 82 (e.g., one or more brushes as described above) via drive train 74b. Motor 72b is also energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., a pad and/or a squeegee, motor 72b and drive train 74b would not be required.

If the cleaning subsystem is active, e.g., driven, it may be beneficial to operate the cleaning apparatus to assist in robot maneuvering operations. For example, two rotating cleaning brushes could be operated in opposite directions so there is no net force on the robot. With a larger single front and/or rear brush rotatable on an axle oriented transverse to the primary direction of robot travel, the brush could be operated to rotate opposite the direction of travel of the track when the robot is maneuvering in the direction of the water flowing past the hull (i.e., downstream). When the robot is maneuvering upstream, it may be desirable to run the brush in the same direction as the track When the robot is maneuvering in a direction transverse to the water flow direction, it may also be desirable to operate the brush and the track in the same direction.

Figure 5:
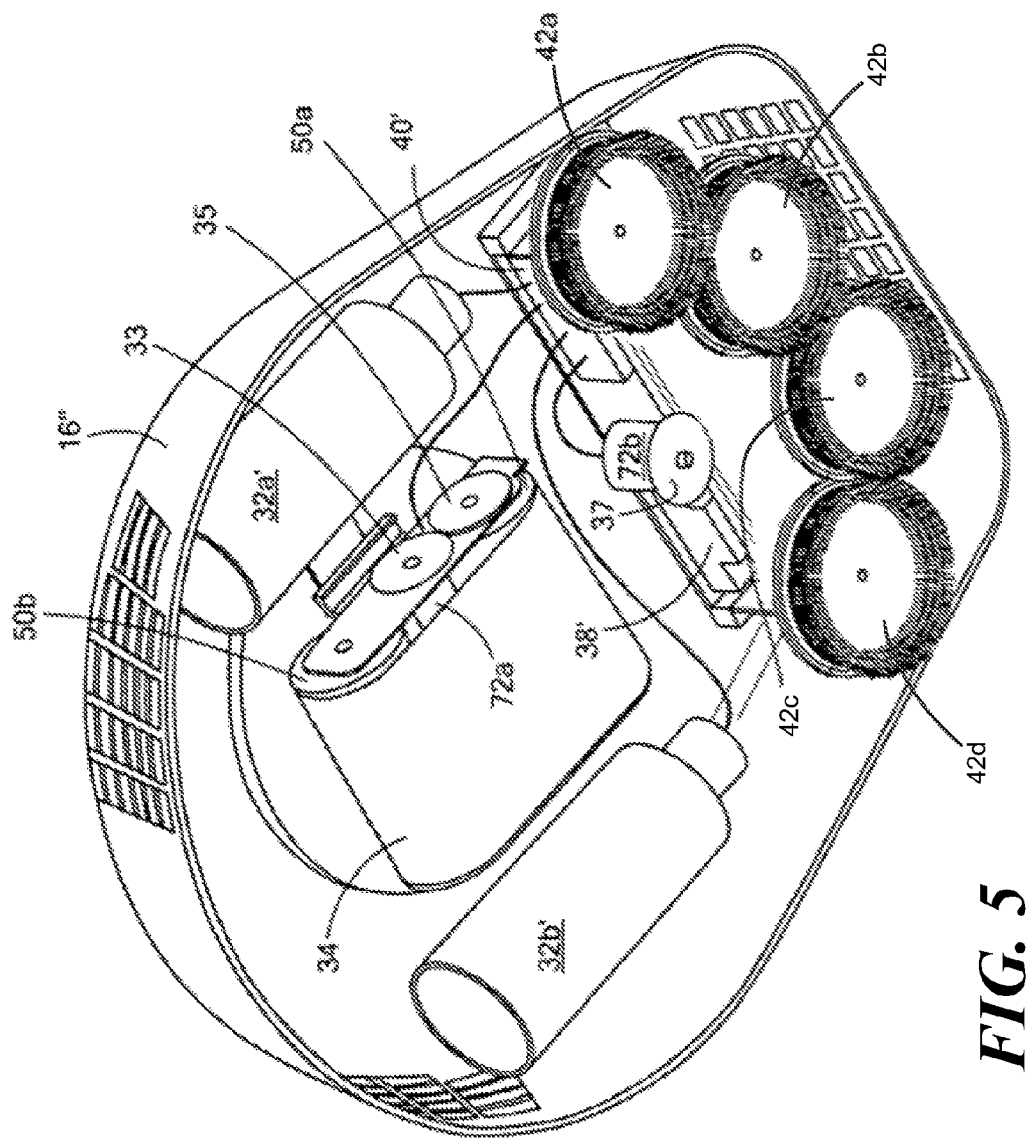
FIG. 5 is a schematic bottom view of a hull cleaning robot in accordance with the subject technology based on the design shown in FIG. 4.

FIG. 5 shows robot body 16" housing turbine/generator units 32a' and 32b' which, when deployed, charge battery 38' via controlling electronics 40'. Battery 38 provides power (via controlling electronics 40') to drive belt motor 72a which turns gear 33 driving gear 35 of drive belt roller 50a. Battery 38 also provides power (via controlling electronics 40') to brush motor 72b which turns gear 37 cooperating with a gear to drive cleaning brush gears 42a-42d. Controlling electronics 40' (typically employing a microprocessor, power circuits, and the like), is also powered by battery 38.

Figure 6:
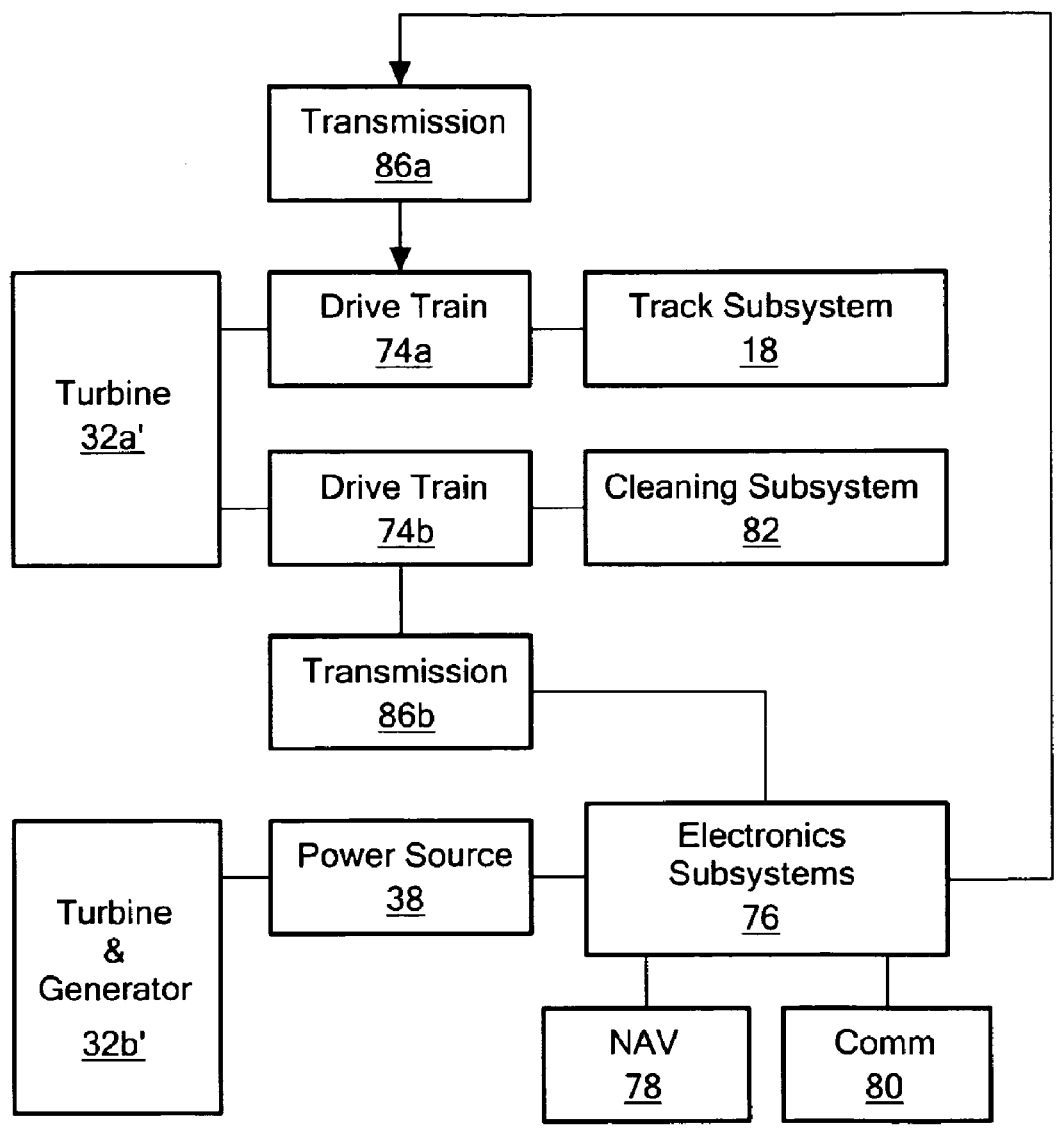
FIG. 6 is a block diagram showing the primary subsystems associated with another version of a hull cleaning robot in accordance with the subject technology.

FIG. 6 illustrates a more direct drive version where turbine 32a', via drive train 74a, drives drive subsystem 18. Turbine 32a, via drive train 74b, also drives cleaning subsystem 82 if it is active. Transmission 86a, under the control of electronic controller subsystem 76, may be associated with drive train 74a to control the operation, speed, and direction of the track subsystem 18. Similarly, transmission 86b, under the control of electronic subsystem 76, may be used to adjust the operation of cleaning subsystem 82.

A hull robot can have significant benefits in inspection, cleaning, maintenance and other operations with respect to a vessel, and particularly a vessel in motion. However, there may be situations where a robot inadvertently becomes detached from the hull of a vessel or ship. For instance, in the case where an electromagnet is used to secure the robot to the hull of the vessel, any loss of power may result in the electromagnet being unable to secure the robot to the hull, and the detachment of the robot from the hull. In other situations, the vessel may strike or come close to an obstacle, such as a rock, river or ocean floor, iceberg, etc. that may knock the robot off of the hull. In still other situations, strong waves may dislodge the robot from the hull. Obviously, other situations may exist where a robot is inadvertently caused to be detached from the hull. Because of the monetary cost and intrinsic value of such robots, it is desirable to not only properly secure the robot to avoid damage or loss, but to be able to retrieve a robot which has become detached from the hull.

In one example, the present technology provides separation countermeasures to address situations where the hull robot does become separated from the vessel. The separation countermeasures can be implemented in any of a variety of different ways with any of a variety of different devices. For example, the separation countermeasures may include sensors or detectors for sensing separation of the robot from the vessel, such as visual, motor current detectors, g-vector sensors, pressure sensors, functional GPS (global positioning system) sensors for detecting discrepancies with respect to a vessel, flow field detectors, noise fiduciary detectors, magnetic sensors, and so forth. Any of a variety of other sensors may also be used which are suitable to detect the presence of the vessel or the attachment state of the robot to a hull of the vessel. The sensors may also be used in any suitable combination.

Figure 7A:
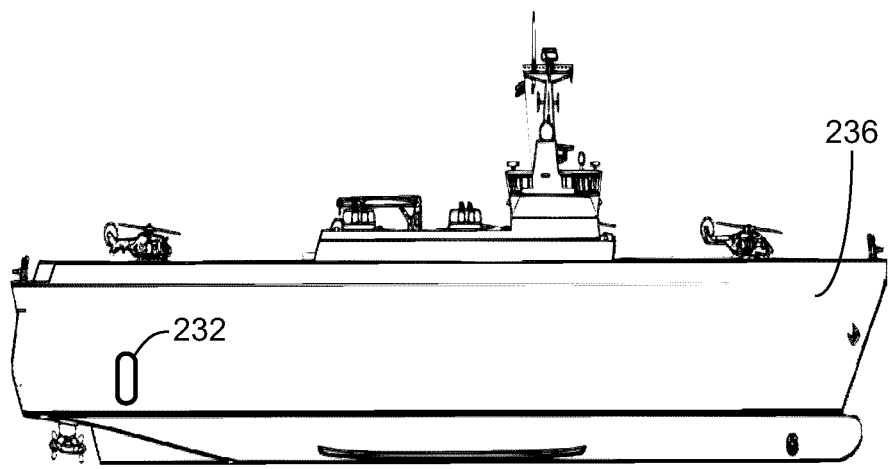
FIG. 7a is a side view of a ship with a hull cleaning robot attached thereto in accordance with the subject technology.
Figure 7B:
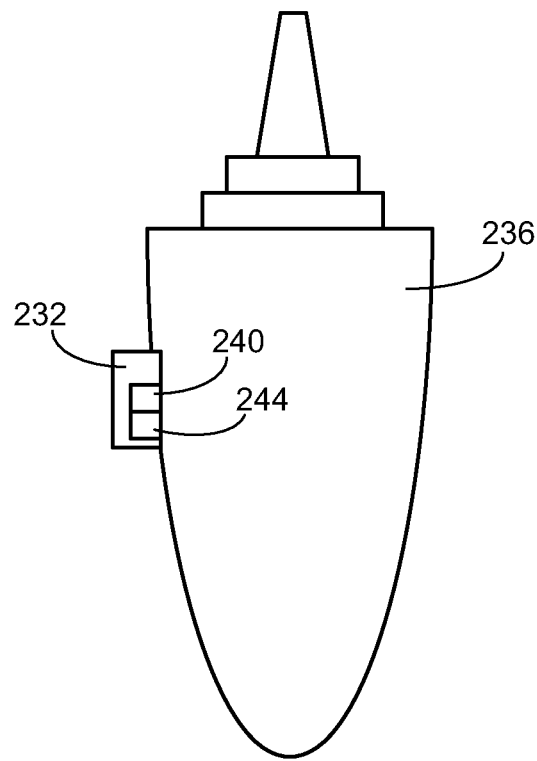
FIG. 7b is an end view of a ship with a hull cleaning robot attached thereto in accordance with the subject technology.

Therefore, referring to FIGS. 7a-b, in accordance with a more specific example, a hull robot 232 can be configured to drive and maneuver about the hull 236. A sensor subsystem 240 onboard the robot can sense an attachment state of the robot to the hull. The attachment state can include at least one of attached (state where the robot is secured to the hull) and detached (state where the robot is separated from the hull). A signal generation subsystem 244 onboard the robot can emit a distress signal when it is sensed that the robot has become detached from the hull (i.e., the detached attachment state).

Figure 8:
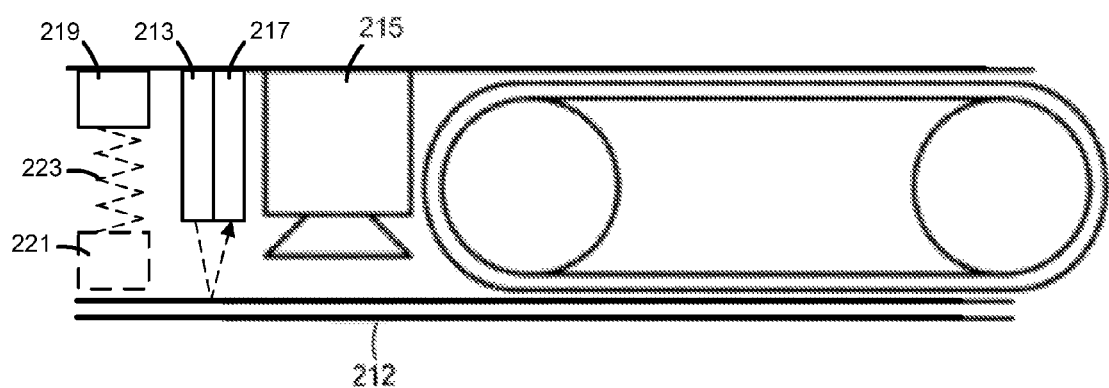
FIG. 8 illustrates an optical detector sensor subsystem on a hull robot in accordance with the subject technology.

In the example shown in FIG. 8, the sensor subsystem can be an optical detector configured to optically detect the hull. For example, the detector 215 can be a camera or other suitable optical detector configured to optically detect whether the hull 212 is adjacent to the robot, or present at all. In one example, the sensor subsystem can use a camera to capture an image and compare data in the captured image with data stored in a memory or in a database using a processor powered by the power supply to determine whether the hull is present. In another example, a laser 213 or other light source can be directed toward the hull of the ship. A reflection of the light can be detected by an optical detector. If the hull is not present, the light will not reflect back towards the detector. If the hull is present, the light will reflect back to the detector and the presence of the hull can be identified and confirmed.

Figure 9:
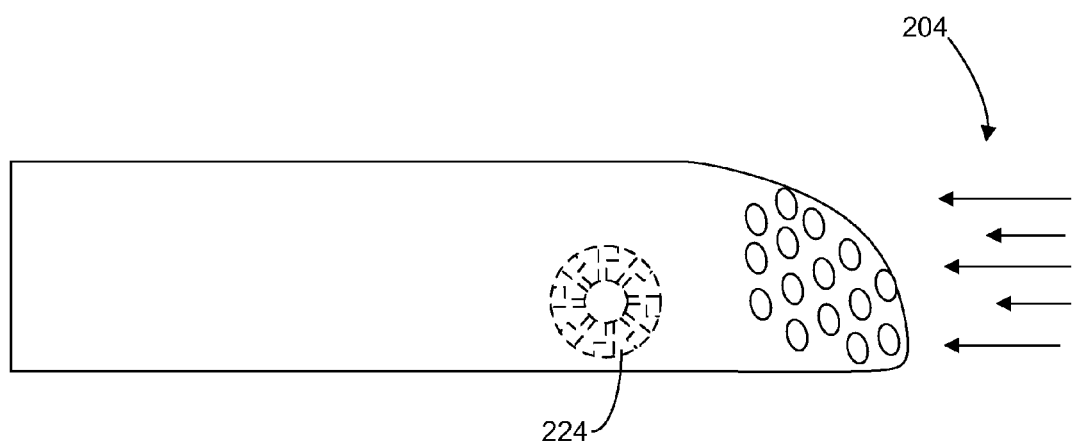
FIG. 9 illustrates a fluid current detector sensor subsystem on a hull robot in accordance with the subject technology.

In another example, the detector 215 can be an ultrasonic detection device. For example, the hull robot may be equipped with an ultrasonic inspection device for use in inspecting the hull of a vessel. In a similar operation as when the ultrasonic inspection device inspects the hull, operation of the ultrasonic inspection device can detect when the hull is not present (i.e., when the hull robot has been separated from the hull). The ultrasonic inspection device can be configured to recognize ultrasonic signatures of a clean hull, a fouled hull, and/or a lack of presence of the hull. For ultrasonic inspection, an ultrasound transducer connected to a diagnostic machine (both of which may be supported on the hull robot and included in the detector 215) is passed over the hull, wherein ultrasonic pulse-waves, such as those with center frequencies ranging from 0.1-50 MHz, can be directed into the hull to detect internal flaws or to characterize hull properties. Ultrasonic inspection can also be used to determine a thickness of the hull, for example, to monitor corrosion. The transducer may be separated from the hull by a couplant, wherein the couplant facilitates transmission of the ultrasonic energy from the transducer into the hull. While oil as a couplant may be used in some examples, the couplant is preferably water, due to the likely immersion of the robot under water on the vessel in motion. Referring to FIG. 9, in one example the sensor subsystem can include a fluid flow detector 224 configured to detect the flow of fluid 204 past the robot. In one aspect, the fluid flow detector can be in the form of a turbine, as has been illustrated and described in preceding examples. In the example shown in FIG. 9, the fluid flow detector can comprise a water wheel (e.g., a Pelton wheel). In still other aspects, the fluid flow detector can be any suitable detector configured to detect the flow of water. The turbine and water wheel are examples of devices that rotate from the flow of water. Other example devices may oscillate due to the flow of water. As another example, the fluid current detector can include a membrane or other structure which flexes when water flows thereupon.

The flow field may be different about various locations of the hull of the vessel. For example, the fluid dynamics of the water can vary from the front of the ship to the back and can vary from near the surface of the water to the bottom of the vessel. This information can be stored in a database and later referenced for use in determining whether, based on the detected fluid flow, the robot has potentially separated from the ship. For instance, in the event a flow field or fluid flow is detected that is outside of a pre-determined range of acceptable fluid flow field parameters, then it may be determined that the robot has detached from the vessel.

With the fluid flow detector configuration, the robot can be configured with a receiver or transceiver to receive a wireless signal from an emitter or other signal generator on the vessel when the vessel is moving or stopping in addition to what is being detected by the fluid flow detector in properly identifying whether the robot is attached to the ship. The wireless signal can be transmitted using any suitable wireless transmission technology such as, but not limited to, radio frequency (RF) communication, microwave communication, infrared (IR) short-range communication, and so forth. RF signals generally do not transmit well through water. As a result, when RF signals are used, the robot can be navigated above the water line to detect the signals. Acoustic modems are an example device can carry out underwater communication. However, the bandwidth of acoustic modems is typically a fraction of what is transmissible in air. As a solution, the signals can be transmitted without the use of high bandwidth signals. For applications where communications require additional bandwidth the acoustic modem can be used to signal the robot to come to the surface to receive a message transmitted via RF signals. Another approach is to have the robot travel above the waterline at regular intervals and to wait to transmit important information during one of these above-waterline intervals. In the event that the robot has become detached from the hull and is resident on a surface of the water, then RF transmission can be a viable way of communicating.

For example, if the ship is moving and the fluid flow detector fails to identify the flow of fluid, the robot may indicate a possible separation from ship as a valid indication. Other factors, such as equipment malfunction on the robot, for example, can also lead to a failure to identify the flow of the fluid, and thus the separation from the vessel in this example may be a valid separation. If the vessel slows or has come to a stop and this relayed to the hull robot, then when the fluid flow detector fails to detect an acceptable fluid flow, the robot can be configured to not identify the lack of fluid flow as a possible indicator that the robot has separated from the vessel.

When the robot detaches from the ship, there may still be at least a minimal flow of water being detected due to currents or waves in the water, movement of the robot within the water (i.e., floating, sinking, driving), and so forth. Therefore, when a flow of water is still detectable and not usable as a basis for identifying a separation from the vessel, communication with the vessel can be useful to determine whether a speed of the vessel corresponds with the detected flow of water to identify whether the robot has potentially become detached from the hull.

In other examples, rather than communicating with the vessel to receive a signal indicative of the stopping, slowing or moving of the vessel, the sensor subsystem can comprise an acoustic detector, such as a microphone, configured to detect sound from the engine of the vessel or from the rotation of turbines or propellers disturbing the water to propel the vessel. When the vessel starts or stops movement, or changes speed, the acoustic detector can detect the change in sound and factor in this information in detecting an attachment state of the robot.

In another example, the sensor subsystem may comprise a detector 219 such as a gravity vector (g-vector) detector configured to detect an angular orientation of the robot relative to a direction of gravity. More specifically, the g-vector detector can be a gravitometer or gravimeter for detecting a direction of gravity. A ship or vessel generally may have a hull with a specific contoured shape. Various positions about the hull (e.g., between a top and a bottom of the hull) may be angled differently with respect to one another. A hull robot equipped with a gravimeter can detect a unique g-vector for substantially any location about the hull. For example, a direction of gravity may remain substantially the same, but an orientation of the robot with respect to the direction of gravity may change as the robot traverses the hull. Thus, in some examples, the g-vector can be determined relative to an orientation of the robot, or more specifically to a longitudinal and/or lateral axis or angular orientation with respect to the detected direction of gravity. The unique g-vectors for the various vertical locations about the hull can be pre-determined and stored in a database that can be referenced when the gravimeter detects the direction of gravity with respect to a current robot position or orientation.

In the event that the robot separates from the ship, a g-vector subsequently detected will likely not be consistent with those acceptable unique g-vectors corresponding to positions of the robot when secured about the hull. Therefore, the robot can identify that detachment has occurred. For example, the robot may be configured to float in the water at an orientation different than the various possible orientations experienced by the robot while on secured to the hull of the vessel. Thus, if the hull robot analyzes a change in vertical orientation of the hull robot by detecting a corresponding g-vector and comparing this with acceptable unique g-vectors, separation or attachment of the robot with respect to the hull can be identified. In another example, rather than, or in addition to, use of the gravimeter, an accelerometer may be used to determine an orientation of the hull robot relative to the ship. The detected orientation data can be used similarly to the gravity data described above.

In accordance with one example, the detector 219 of the sensor subsystem can be a pressure detector configured to detect a pressure of fluid (e.g., water pressure) about the robot. Pressure generally will have a direct correspondence with a depth beneath a surface of the water. Pre-determined pressure information can be generated and stored in a database onboard the robot for later comparison to facilitate identification of an approximate vertical position on the side of the vessel hull. In one aspect, with the robot and the pressure sensor submersed, when a pressure is detected, reference to the database using a processor can identify the current pressure and the associated approximate vertical position about the hull by comparing the current pressure to those stored. In another aspect, the pressure sensor, or one or more different sensors, can further be configured to detect a pressure out of water as well. Thus, the pressure sensor(s), alone or in combination if multiple sensors are present, can determine whether the robot is above or beneath (or at) the water level, as well as an approximate vertical position about the hull. In addition, the pressure sensor can also be configured to determine a distance the robot is away from the water level, with depth or pressure measurements corresponding to a distance above or below the water, wherein an at-the-water line pressure can be determined and used for comparison.

In operation about the hull and as secured to the hull, water pressure about the robot may generally be identifiable. In addition, the navigation subsystem can be used to identify a given position about the hull. Using this information, the robot can then determine what the water pressure should be at this given position. If the detected pressure is different from than expected, or if outside of an acceptable range, then potential separation from the ship can be identified. In another example, if the robot is using the drive system to navigate the hull in a direction that should result in a change of pressure, but the pressure sensor does not detect a change in pressure, the cause could be that separation has been occurred. In another example, the pressure sensor can be configured to identify a rapid change in pressure, such as with a sinking or rising event. Typically such rapid changes in pressure will not occur during normal operation on the vessel hull, thus indicating possible separation of the robot from the hull. Still further, pressure changes can be monitored to ensure that these are consistent with acceptable movements of the robot about the hull. For example, if the robot is commencing a cleaning function at a particular location, the water pressure at that location can be identified. If the water pressure begins to change, and the robot has not initiated locomotion from that position (e.g., known because the drive subsystem has not initiated), this could indicate that the robot has been separated from the hull.

In another example, the detector 219 of the sensor subsystem can be a global positioning system or GPS device configured to track or provide a location of the robot, and may further be configured to track the location of the robot relative to the vessel. The robot, via its GPS device, can be in communication with the vessel, particularly in the event of separation from the hull. The GPS can detect whether relative movement between the vessel and the robot is increasing.

In one example, the detector 219 of the sensor subsystem can be a magnetometer or compass. The presence of the metallic hull may generally skew magnetic readings with respect to magnetic North. Therefore, the sensor subsystem can identify the presence of the hull when the magnetic reading is different than magnetic North and may identify a potential separation from ship when the reading is magnetic North. Because the ship may navigate in a direction that causes the biased reading to read the same as the direction of magnetic North, the robot can be configured to change an orientation or position on the hull when a magnetic North reading is detected in order to determine whether the reading potentially represents a separation from the ship as opposed to an orientation of the ship.

Similarly, the sensor subsystem can comprise one or more magnets supported and positioned a given elevation about the hull, which magnets can be associated with a magnetic sensor. An attraction of the magnet to the hull can be detected and compared with pre-determined acceptable attraction valued. For example, the detector 219 can be an electromagnet with detection capabilities to identify the magnetic attraction or field. Other implementations, such as a spring-loaded permanent magnet 221 may also be used where the detector 219 is configured to detect whether the spring 223 is extended due to a magnetic attraction between the permanent magnet and the hull. If a currently measured attraction falls below an acceptable threshold, or no longer exists, such a condition may indicate separation of the robot from the hull. Since magnetic fields vary as the cube of the distance, the drop-off rate is very fast.

The detector 219 of the sensor subsystem in some examples can be a noise detector configured to detect noise of the vessel, water coming in contact with the vessel, etc. as has been briefly mentioned above. Noise or sound can be used to determine the presence of the vessel. More specifically, the sensor subsystem can make use of existing or natural boat derived noise fiduciaries to identify whether the ship is present and/or operational. The sensor subsystem can include a microphone or other suitable acoustic detector for detecting the noise. In this example, noise generation systems onboard the vessel can generate the identifying noise. The vessel need not include specially designed noise generation systems as the vessel typically already generates identifying noises, such as engine noise and bow noise (i.e., propeller operation and water hitting the bow of the vessel). In some instances, equipment with or on the vessel at locations other than the engine, propeller, or bow may also provide identifying noises. The location of the bow noise and the engine noise are known. The noises from these generally have certain frequencies that can be measured to determine which noise is being detected. The sensor subsystem can use one or both of these (or any other noise fiduciaries) to determine the presence of the ship. If a noise fiduciary is not detected, or if such falls below an acceptable level, this could indicate separation of the robot from the hull.

Figure 10:
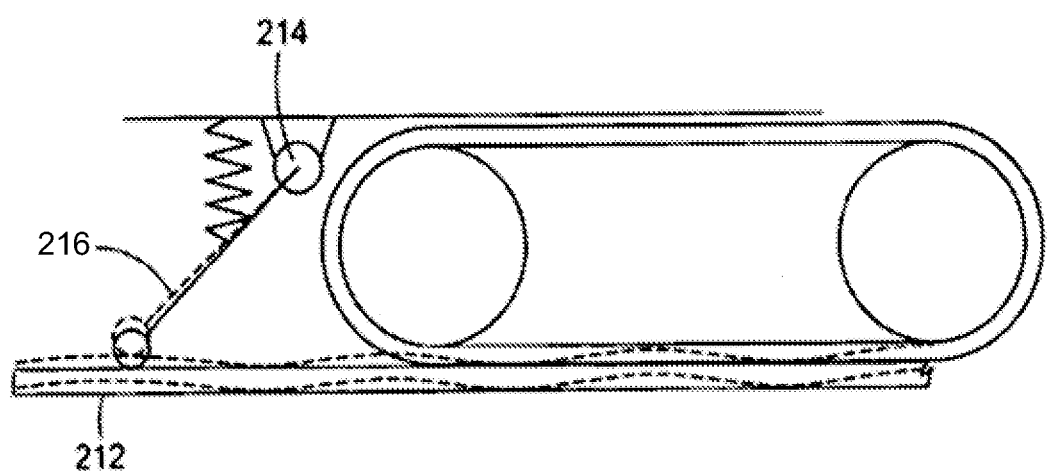
FIG. 10 illustrates a spring-loaded hull detector in accordance with the subject technology.

The sensor subsystem can include a spring-loaded or other suitable device configured to apply a force or pressure against the hull 212 of the vessel, such as the device as illustrated in FIG. 10. In this embodiment, the device comprises an arm 216 pivotally supported about a base 214, wherein the arm is biased in the direction of the hull by a biasing element, such as a spring. The device can be associated with a sensor incorporated in the base that can identify various states of the device. For example, the biasing element or spring may be compressed a certain extent when the hull is present and released or uncompressed when the robot is detached from the ship. In this case, the compression in the spring can be sensed or detected. In another example, the force exerted by the arm on the hull can be sensed or detected. The robot can thus identify, based on the state of the spring-loaded device and whether the detected values are acceptable as compared with known values, whether the robot is attached to the ship.

In another exemplary implementation, the arm 216 supported by the base 214 can be magnetized. The base can include a strain gauge, rotation detector, or other suitable device for detecting a force on or rotation of the arm. The spring-loaded magnetic arm can be biased away from the hull, and a magnetic attraction between the arm and the metal hull can draw the arm closer towards the hull or into contact with the hull. When a strain on the arm or a rotation of the arm changes to a relaxed or non-attracted position, a separation from the hull surface can be identified.

In another example, the sensor subsystem can emit sound waves for reflection from the hull. When reflected sound waves are detected, the robot can identify the hull presence. When sound waves are not detected, a potential separation from ship may have occurred. The sound waves can be generated by tapping the hull or through the use of a speaker. A microphone or other acoustic detector can detect the sound of the tapping or the reflected sound waves.

In yet another exemplary embodiment, the sensor subsystem can comprise a non-destructive hull inspection system operable about the robot to perform one or more inspections of the hull of the vessel. The non-destructive hull inspection system can be operable with the signal generation subsystem, such that when the inspection system is in operation yet nothing is being detected, or in other words, in the event the inspection system is detected as not inspecting a portion of the hull as it otherwise should, this can indicate a detached state and the signal generation subsystem can provide a distress signal as described below. The non-destructive inspection system can comprise any number of inspection type systems, such as an ultrasonic inspection system, an eddy current detection system, a magnetic field detection system, a displacement gauge system, an optical interferometry system, a paint integrity inspection system, an acoustic emission-based inspection system, and others.

When the robot has identified a potential separation from the ship, or in the event the robot confirms separation from the vessel, the robot can indicate a distressed state, wherein a signal generation subsystem of the robot can generate a distress signal via a distress signal module and can emit/transmit the distress signal with a distress signal emitter. The distress signal can be encrypted if desired. In one aspect, the distress signal generated can be one that causes the robot to take a particular action, one that can be transmitted wirelessly to the vessel, or one that can be broadcast to enable any vessel or land-based receiver to detect the signal. It is contemplated herein that the signal can be any suitable type of signal depending on how and where the signal is being transmitted, such as a wired, wireless, radio, optical, acoustical, or other signal, or a combination of these.

In one exemplary embodiment, the distress signal can comprise a position indicator configured to notify the vessel (or another receiving location) so that an appropriate action can be taken, such as to retrieve the robot. In one aspect, the position indicator can be GPS based, wherein the robot and the vessel GPS systems can communicate back and forth, or otherwise be coordinated, such that one or both of the vessel and robot GPS systems can identify a discrepancy between the relative position of the vessel and the robot. In another aspect, the GPS on the robot can be activated only upon separation and caused to be operable with the signal generation subsystem to allow the distress signal to comprise and transmit the GPS coordinates of the robot. The vessel can be configured to receive a transmitted GPS signal from the robot, thus signaling to the vessel that separation has occurred. In this case, the coordinates can be relayed to the vessel (or any receiver located on the water or on land) to facilitate retrieval of the robot.

In another exemplary embodiment, the distress signal can comprise a signal generated from a satellite phone. The signal generation subsystem can comprise a satellite phone operable to send the distress signal. Again, the signal generation subsystem can be operable with a global positioning system to enable the distress signal to comprise the GPS coordinates of the robot.

In other examples, when the robot detects a potential separation from ship, or confirms separation, the distress signal can comprise an optical beacon (e.g., pulsing light, spotlight, etc.), an audio signal, a flare, etc. Essentially, the robot can be configured to provide an indication of its separation, as well as a signal for locating the robot after separation. Other methods and systems capable of facilitating location of the robot after separation, other than those described herein, will be apparent to those skilled in the art, and are contemplated herein.

In yet other examples, the present technology further comprises various systems and methods to surface the hull robot after a separation from the vessel so as to prevent the robot from sinking and being likely unrecoverable. For example, the robot can be equipped with one or more internal and/or external inflatable buoyancy elements. In other examples, the hull robot can be configured to be inherently buoyant by including or being formed from, at least in part, a buoyant material, such as closed cell foam. It is contemplated that an inherently buoyant robot may also include built-in air bladders, and so forth.

Figure 11A:
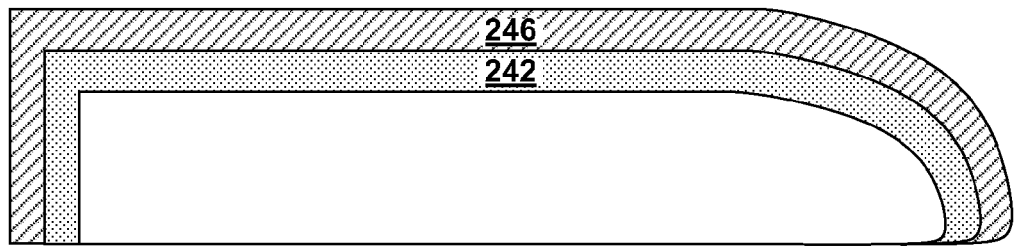
FIGS. 11a-11b are cross-sectional side views of a hull robot body including a buoyant material in accordance with the subject technology.
Figure 11B:
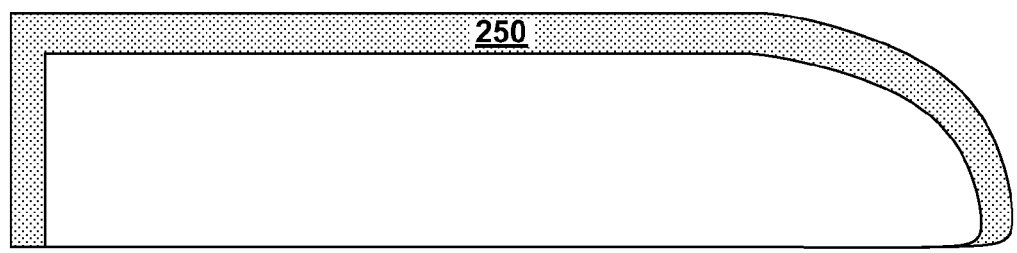
Figure 12A:
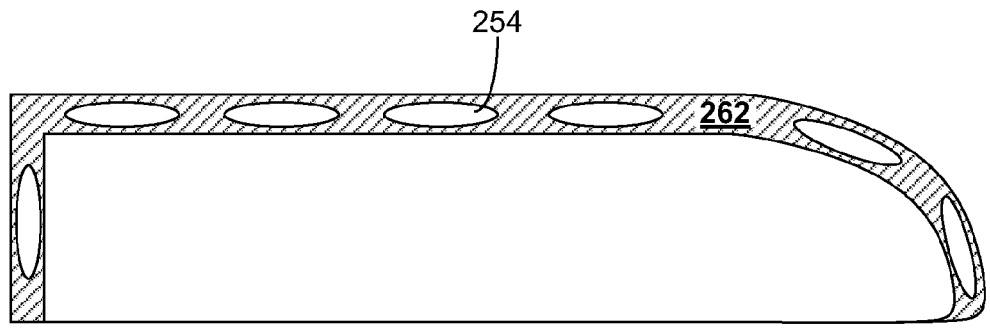
FIGS. 12a-12b are cross-sectional side views of a hull robot body including a buoyant air pockets and bladders in accordance with the subject technology.
Figure 12B:
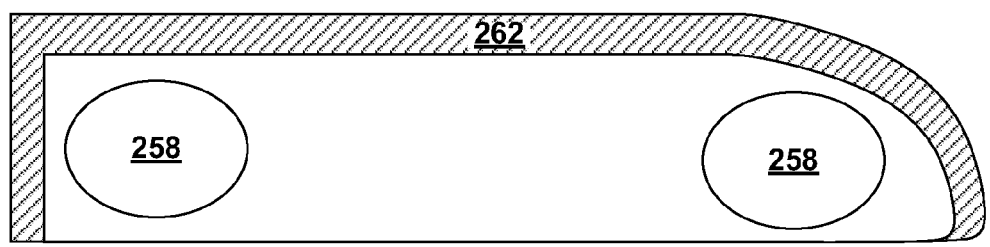

A robot surfacing device can cause the robot to float to the surface in the event the robot becomes separated from the hull. For example, as shown in FIG. 11a, the robot surfacing device may comprise a buoyant material 242 formed about at least a part of the robot body 246. Buoyant materials may comprise foam, wood, composite structural materials, and others. In another example, the robot body 250 itself may be made of a buoyant material, such as foam, as illustrated in FIG. 11b. Buoyant materials or systems other than foam are also contemplated. For example, air pockets 254 or bladders 258 can be built into or attached to the robot body 262 as illustrated in FIGS. 12a-12b, and the air therein can provide sufficient buoyant force to cause the robot to float in the water.

Figure 13A:
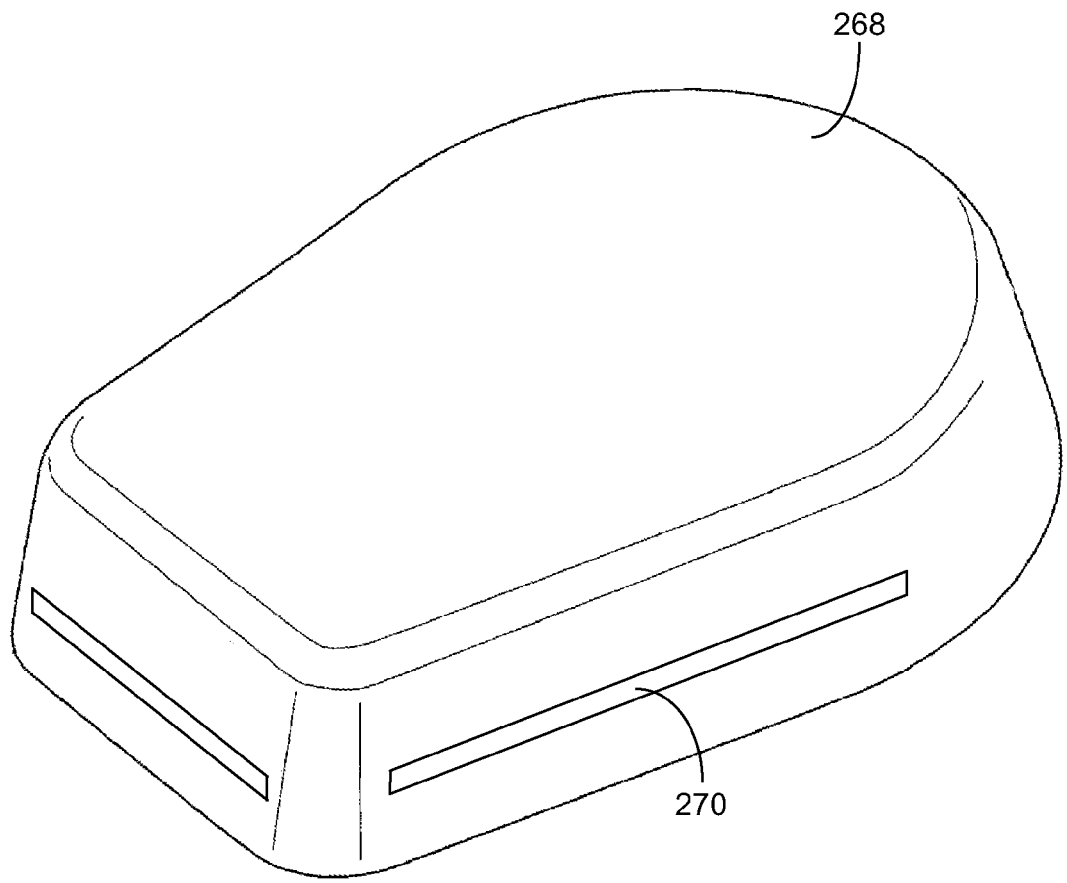
FIGS. 13a-13b illustrate inflation of an inflatable flotation device carried by the robot in accordance with the subject technology.
Figure 13B:
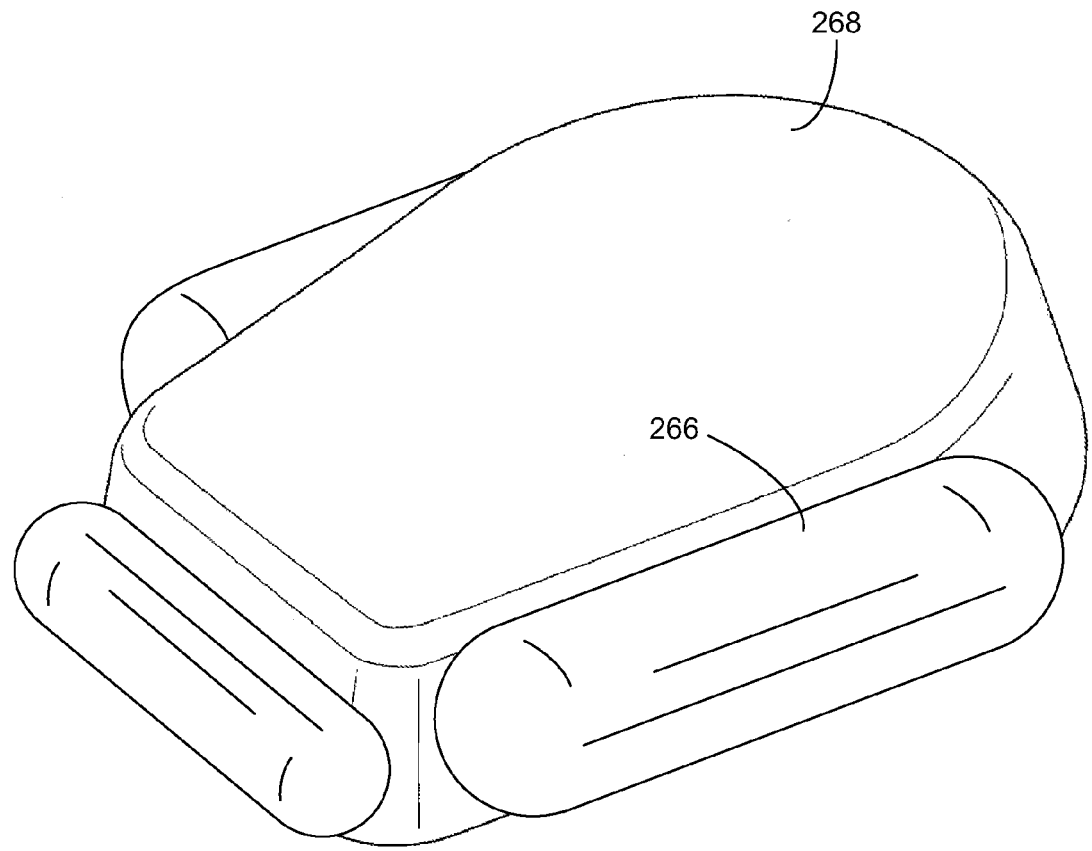

In further examples, the robot surfacing device can comprise an inflatable flotation device supported about the robot and operable with an inflation element (e.g., compressed gas tank) in fluid communication with the inflatable flotation device, wherein the inflation element is operable to inflate the inflatable flotation device upon separation of the robot from the hull. For example, inflatable flotation devices in the form of inflatable air bladders or tubes can be supported on the inside or outside of the robot and can be caused to inflate when the attachment state is detached. In the example shown in FIGS. 13a-13b, one or more inflatable tubes 266 (see FIG. 13b) can be supported about the robot body (e.g., and interior portion) which, when inflated, can be caused to extend through slots 270 formed in the robot body 268, or alternatively, caused to extend under or above the robot body. Inflation can be accomplished with, and the robot can further or alternatively comprise, an inflation element, such as a CO2 (carbon dioxide) cartridge, a refrigerant (e.g., Freon) dispenser, a chemical reaction that generates a gas (e.g., an explosion), and so forth. In one example regarding chemical reactions, a chemical can be used to react with water to produce a gas (examples include metallic sodium, lithium, calcium, magnesium, and other reactive metals, sodium bicarbonate (NaHCO3)). In another example, two chemicals can be caused to mix together like calcium carbonate and hydrocloric acid. In still another example, one chemical can be triggered into releasing gas like sodium azide (NaN3 used in air bags), gun powder, and its many variants.

The inflatable tubes may at least partially circumscribe a perimeter of the robot body and can be configured to float the robot when inflated.

Figure 14:
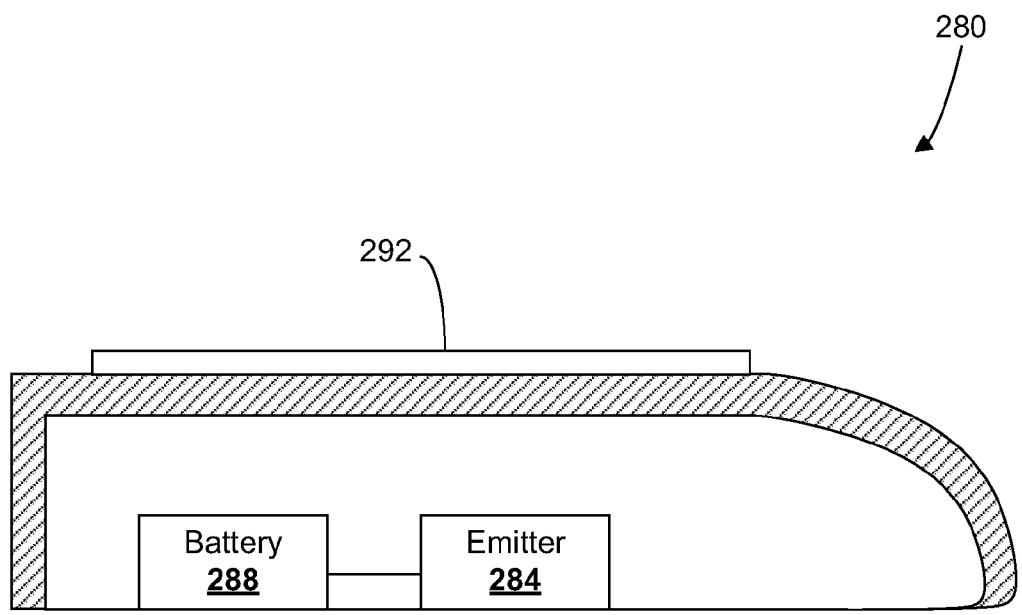
FIG. 14 is a simplified cross-sectional side view of a hull robot configured to scavenge power and emit a distress signal in accordance with the subject technology.

Referring to FIG. 14, once the robot is caused to be surfaced, one or more distress or other signals may be generated from the robot 280 to assist in recovery, or to signal the vessel that separation has occurred. One or more distress signal emitters 284 (e.g., the distress module), such as RF (radio frequency) emitters, GPS devices, and so forth, as discussed above, as well as other sensors, processor(s), memory device(s) and so forth can be powered by the power supply, such as via batteries 288, on-board solar panels 292, salt-water electrolyte batteries, or any combination of these. The salt-water electrolyte batteries can be batteries which include a material that is activated when salt/sea water is allowed to enter previously dry cells. More specifically, the salt-water electrolyte battery may be activated by flow of salt water into dry cells of the salt-water electrolyte battery when the distress module identifies the distress situation. The distress module may open a port to the dry cells of the the salt-water electrolyte battery when the distress situation is identified, where the open port is in fluid communication with fluid in which the hull robot is at least partially submersed. Thus, for example, when a separation from ship has been detected, the robot can open a valve or panel to allow the salt water to enter the dry cells to cause the chemical reaction which results in generation of electrical power.

Figure 15:
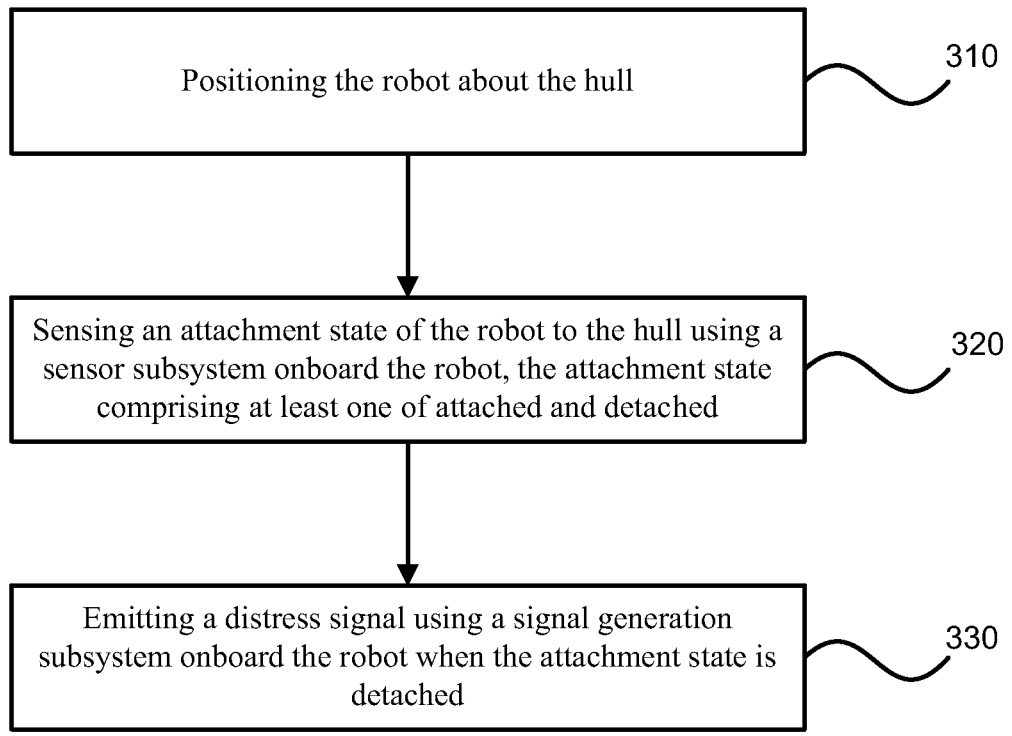
FIG. 15 is a flow diagram of a method of detecting detachment of a hull robot from a surface of a hull of a vessel in accordance with the subject technology.

Referring now to FIG. 15, a flow diagram of a method of detecting detachment of a hull robot from a surface of a hull of a vessel is illustrated in accordance with an example of the present technology. The method can include positioning 310 the robot about the hull and sensing 320 an attachment state of the robot to the hull using a sensor subsystem onboard the robot. The method can further include emitting 330 a distress signal using a signal generation subsystem onboard the robot when the attachment state is detached.

In more detailed examples, the method can include buoying or surfacing the robot to float to a water surface when the attachment state is one of detached. Surfacing the robot can further include inflating an inflatable flotation device coupled to the robot using a compressed gas tank carried by the robot.

In accordance with other examples which have been described in greater detail above, sensing an attachment state of the robot can include optically detecting the presence of the hull using an optical detector; detecting the flow of fluid past the robot using a fluid flow detector; detecting an angular orientation of the robot relative to gravity using a gravity vector detector; detecting a pressure of fluid surrounding the robot using a pressure detector; tracking a location of the robot using a global positioning system device; detecting noise of the vessel using a noise detector; and so forth.

Sensing an attachment state of the robot can further include operating a non-destructive inspection system to inspect the hull of the vessel, and monitoring the output of the inspection system. Under normal operating scenarios, inspection of the hull, and the output by the inspection system thereof, can indicate an attached state of the robot. In the event the output indicates no inspection is taking place when it otherwise should be, and when the inspection system is operating normally, this can indicate a detached state of the robot and the signal generation subsystem (which can be made to be operable with the inspection system) can generate a distress signal, as taught herein.

Figure 16:
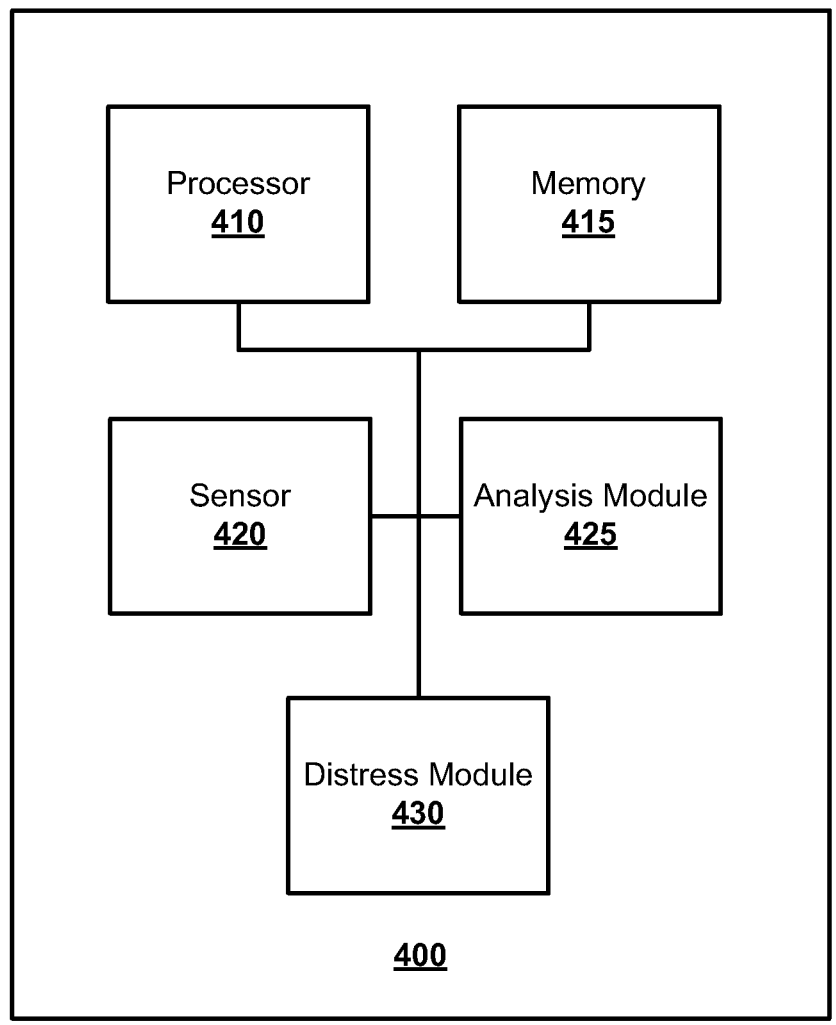
FIG. 16 is a block diagram of a system for detecting detachment of a hull robot from a surface of a hull of a vessel is described in accordance with an example of the present technology.

Referring now to FIG. 16, a system 400 for detecting detachment of a hull robot from a surface of a hull of a vessel is illustrated in accordance with an example. The system can include a processor 410 and a memory 415. The memory can be used for storing vessel related and/or robot related data. In one aspect, the memory may be a non-transitory computer readable storage media. In another aspect, the memory may compress random access memory (RAM). In yet another aspect, the memory may comprise both the non-transitory media and the RAM and the detected characteristic may be stored in the RAM while the stored property data is stored on the non-transitory media. The processor can access both the RAM and the non-transitory media to compare the data, according to computer readable program instructions, for use in identifying the presence of the hull adjacent to the robot.

The system can include a sensor 420 supported on the hull robot and configured to detect an attachment state of the robot relative to the hull, the attachment state comprising at least one of attached and detached. The sensor may be any suitable type of sensor operating in any suitable manner to detect the attachment state, as has been set forth above. A distress module 430 carried by the hull robot can be configured to identify a distress situation when the attachment state of the robot relative to the hull is detached.

In one aspect, the system can include a hull detection analysis module 425 carried by the hull robot can be configured to use the processor to analyze the data obtained by the sensor 420, and/or to compare the data obtained by the sensor with stored data to identify the presence of the hull and/or to determine an attachment state of the robot relative to the hull. In some examples, the distress module 430 can identify the distress situation when the presence of the hull is not identified or detected.

In one embodiment, the detection analysis module 425 can detect a separation from the ship based on an amount of electrical current a cleaning, drive or other subsystem is able to draw. For example, a cleaning subsystem will draw limited to no current when the hull robot is separated from the hull and not generating power as opposed to when the robot is attached to the hull, generating power, and/or actively cleaning the hull. Likewise, a drive system will draw a much lower amount of current (or no current at all) when the robot is separated from the ship as opposed to when the drive subsystem is used to facilitate locomotion of the robot about the hull. Stated differently, the load on the track motors (i.e., the motor current draw) will be measurably different in the situation where the robot is separated from the hull versus the situation where the robot is driving about the hull.

In another embodiment, the detection analysis module 425 can detect a separation from the ship based on an electrical and/or physical load on a drive subsystem. For example, the electrical current draw for a motor driving the track for navigation of the hull robot upon the hull will be markedly different when the track is operating on a hull surface as compared with moving freely in water or in air. Further separation detection examples can include detecting the power being generated by the power scavenging systems, wherein the power generated will likely be little to no power upon separation.

In one aspect, a velocity threshold may exist for passing fluid to actuate drive subsystems, cleaning subsystems, energy extraction devices and so forth. A velocity of passing fluid may be a result of the vessel to which the hull robot is attached being in motion at a velocity meeting or exceeding a pre-determined velocity or the velocity threshold. When the separation from the ship is detected, the fluid flow past the hull robot may decrease below the velocity threshold such that driving and cleaning functions are ceased and energy may be used for emitting the distress signal, inflating buoyancy devices and so forth as has been described.

The methods and systems of certain examples may be implemented in hardware, software, firmware, or combinations thereof The methods disclosed herein can be implemented as software or firmware that is stored in a memory and that is executed by a suitable instruction execution system (e.g., a processor). If implemented in hardware, the methods disclosed herein can be implemented with any suitable technology that is well known in the art.

Also within the scope of this disclosure is the implementation of a program or code that can be stored in a non-transitory machine-readable medium to permit a computer or processor to perform any of the methods described above.

Some of the functional units described in this specification have been labeled as modules, in order to more particularly emphasize their implementation independence. The various modules, engines, tools, etc., discussed herein may be, for example, software, firmware, commands, data files, programs, code, instructions, or the like, and may also include suitable mechanisms. For example, a module may be implemented as a hardware circuit comprising custom VLSI (very large scale integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A hull robot configured to operate on a surface of a hull of a vessel, comprising:
a drive subsystem onboard the robot for driving and maneuvering the robot about the hull;
a sensor subsystem onboard the robot configured to sense an attachment state of the robot relative to the hull, the attachment state comprising at least one of attached and detached;
a signal generation subsystem onboard the robot configured to emit a distress signal when the attachment state is detached; and
a robot surfacing device configured to cause the robot to float to a fluid surface when the attachment state is detached.

2. The robot as in claim 1, wherein the robot surfacing device comprises a buoyant material.

3. The robot as in claim 2, wherein the buoyant material is selected from the group consisting of foam, wood, composite structural materials, and any combination of these.

4. The robot as in claim 1, wherein the robot surfacing device comprises an inflatable flotation device and an inflation element in fluid communication with the inflatable flotation device, wherein the inflation element is operable to inflate the inflatable flotation device upon separation of the robot from the hull.

5. The robot as in claim 3, wherein the inflation element comprises a compressed gas coupled to the inflatable flotation device to inflate the inflatable flotation device when the attachment state is detached.

6. The robot as in claim 4, wherein the inflation element comprises a carbon dioxide cartridge.

7. The robot as in claim 4, wherein the inflation element comprises a refrigerant dispenser.

8. The robot as in claim 4, wherein the inflation element comprises a chemical operable to react to generate or release a gas.

9. The robot as in claim 8, wherein the chemical comprises one sufficient to react with water to produce a gas.

10. The robot as in claim 8, further comprising a second chemical operable to mix with and react with the chemical.

11. The robot as in claim 1, wherein the sensor subsystem comprises an optical detector configured to optically detect the hull.

12. The robot as in claim 1, wherein the sensor subsystem comprises a fluid flow detector configured to detect the flow of fluid past the robot.

13. The robot as in claim 1, wherein the sensor subsystem comprises a gravity vector detector configured to detect an angular orientation of the robot relative to gravity.

14. The robot as in claim 1, wherein the sensor subsystem comprises a pressure detector configured to detect a pressure of fluid surrounding the robot.

15. The robot as in claim 1, wherein the sensor subsystem comprises a global positioning system device configured to track a. location of the robot relative to the vessel.

16. The robot as in claim 1, wherein the sensor subsystem comprises a. noise detector configured to detect at least one of noise of the vessel and noise of a fluid in contact with the vessel.

17. The robot as in claim 1, wherein the sensor subsystem comprises a magnetic sensor configured to sense a magnetic field between the robot and the hull of the vessel.

18. The robot as in claim 1, wherein the sensor subsystem comprises a non-destructive hull inspection system, and wherein the signal generation subsystem is operable with the non-destructive hull inspection system.

19. The robot as in claim 1, wherein the non-destructive hull inspection system comprises a system is selected from the group consisting of an ultrasonic inspection system, an eddy current detection system, a. magnetic field detection system, a displacement gauge system, an optical interferometry system, a paint integrity inspection system, an acoustic emission-based inspection system, and any combination of these.

20. A method of detecting detachment of a hull robot from a surface of a hull of a vessel, comprising:
positioning the robot about the hull;
sensing an attachment state of the robot to the hull using a sensor subsystem onboard the robot, the attachment state comprising at least one of attached and detached;
emitting a distress signal using a signal generation subsystem onboard the robot when the attachment state is detached; and
buoying the robot to float to a fluid surface when the attachment state is detached.

21. The method as in claim 20, wherein buoying the robot comprises inflating an inflatable flotation device coupled to the robot using a compressed gas tank carried by the robot.

22. The method as in claim 20, wherein sensing an attachment state of the robot comprises optically detecting the presence of the hull using an optical detector.

23. The method as in claim 20, wherein sensing an attachment state of the robot comprises detecting the flow of fluid past the robot using a fluid flow detector.

24. The method as in claim 20, wherein sensing an attachment state of the robot comprises detecting an angular orientation of the robot relative to gravity using a gravity vector detector.

25. The method as in claim 20, wherein sensing an attachment state of the robot comprises detecting a pressure of fluid surrounding the robot using a pressure detector.

26. The method as in claim 20, wherein sensing an attachment state of the robot comprises tracking a location of the robot relative to the vessel using a global positioning system device.

27. The method as in claim 20, wherein sensing an attachment state of the robot comprises detecting at least one of a noise of the vessel and a noise of a fluid contacting the hull of the vessel, using a noise detector.

28. The method of claim 20, wherein sensing an attachment state of the robot comprises operating a. non-destructive inspection system, and monitoring an output of the non-destructive inspection system.

29. A system for detecting detachment of a hull robot from a surface of a hull of a vessel, comprising:
a processor;
a memory for storing hull property data;
a sensor carried by the hull robot and configured to detect an attachment state of the robot relative to the hull, the attachment state comprising at least one of attached and detached; and
a distress module carried by the hull robot and configured to identify a distress situation when the attachment state of the robot relative to the hull is detached, wherein the hull robot is caused to float to a fluid surface.

30. The system of claim 29, further comprising a power supply for providing power to the processor, memory, sensor and distress module.

31. The system of claim 30, wherein the power supply is solar powered.

32. The system of claim 30, wherein the power supply comprises a salt-water electrolyte battery activated by flow of salt water into dry cells of the salt-water electrolyte battery when the distress module identifies the distress situation.

33. The system of claim 30, further comprising a signal generation subsystem comprising the distress module, the signal generation subsystem configured to emit a distress signal when the attachment state is detached.

34. The system of claim 33, wherein the signal generation subsystem comprises a satellite phone operable to send the distress signal.

35. The system of claim 33, wherein the signal generation subsystem and distress module is operable with a global positioning system, such that the distress signal comprises coordinates of the hull robot.

36. The system of claim 33, wherein the signal generation subsystem comprises a radio transmitter operable to send the distress signal, the distress signal being a radio signal transmitted at a given frequency.

37. The system of claim 36, wherein the signal generation subsystem and distress module is operable with a. global positioning system, such that the radio signal comprises coordinates of the hull robot.

38. The system of claim 33, wherein the distress signal comprises a signal type selected from the group consisting of wired, wireless, radio, optical, acoustical, and a combination of these.

* * * * *